United States Patent [19]
Kasai et al.

[11] Patent Number: 5,830,051
[45] Date of Patent: Nov. 3, 1998

[54] APPARATUS FOR MANFACTURING SAUSAGES OR THE LIKE HAVING DESIRED LINK LENGTH

[75] Inventors: Minoru Kasai, Kanagawa; Nimoru Nakamura, Tokyo, both of Japan

[73] Assignee: Hitec Co., Ltd., Tokyo, Japan

[21] Appl. No.: 680,064

[22] Filed: Jul. 15, 1996

[30] Foreign Application Priority Data

Jul. 21, 1995 [JP] Japan .................................. 7-207480

[51] Int. Cl.⁶ .................................................. A22C 11/10
[52] U.S. Cl. .............................................. 452/48; 452/46
[58] Field of Search .................... 452/46, 47, 48

[56] References Cited

U.S. PATENT DOCUMENTS

| | | | |
|---|---|---|---|
| 1,564,588 | 12/1925 | Kruse | 452/46 |
| 1,866,497 | 7/1932 | Allen et al. | |
| 3,115,668 | 12/1963 | Townsend | |
| 4,129,923 | 12/1978 | Hoegger | |
| 4,418,447 | 12/1983 | Ziolko | 452/46 |
| 4,614,005 | 9/1986 | Townsend | |
| 4,671,042 | 6/1987 | Moekle et al. | |
| 5,049,108 | 9/1991 | Staudenrausch | |

FOREIGN PATENT DOCUMENTS 40-27509  12/1965  Japan.
2-268638  11/1990  Japan.

*Primary Examiner*—Willis Little
*Attorney, Agent, or Firm*—Nixon & Vanderhye

[57] ABSTRACT

An apparatus 1 for manufacturing sausages or the like includes: a rotating device 5 for rotating a stuffed casing 3 about its longitudinal axis in an R direction; a plurality of nipping devices 7 for nipping the stuffed casing 3 from the rotating device 5; a moving device 8 for circulatingly moving the nipping devices 7 such that the nipping devices 7 are moved in a B direction in a circulating manner in conjunction with the movement of the stuffed casing 3 in an A direction; and a device 9 for causing a predetermined nipping device 7 to effect a constricting operation with respect to the stuffed casing by fully closing the predetermined nipping device in association with the movement of the nipping devices in the B direction by the moving device 8.

28 Claims, 17 Drawing Sheets

APPARATUS FOR MANFACTURING SAUSAGES OR THE LIKE HAVING DESIRED LINK LENGTH

BACKGROUND OF THE INVENTION

1. Field of the Invention

The present invention relates to an apparatus for manufacturing a chain of food products such as sausages, mentaiko (seasoned and salted walleye pollack roe), cheeses, or the like having a desired link length.

2. Description of the Related Art

As disclosed in Japanese Patent Application Publication No. 27509/1965, a conventional apparatus of this type is generally comprised of a rotating means whereby a continuous stuffed casing stuffed with a raw material is rotated about its longitudinal axis and a conveying means for conveying the stuffed casing in its longitudinal direction. The conveying means is provided with a pair of endless chains disposed in face-to-face relation and pairs of constricting members which are attached to the respective endless chains in series at fixed intervals each corresponding to the length of one link. The stuffed casing is constricted by each pair of constricting members from both sides, and a twist is produced in the stuffed casing at the constricted position, thereby forming the stuffed casing into linked products such as sausages divided via the twisted portions.

In addition, as disclosed in Japanese Patent Application Laid-Open No. 268638/1990, there has also been proposed an apparatus concerning sausages wherein constricting members are disposed between a holding ring for imparting rotation to strands of sausages and a conveying device for conveying divided sausages, and the rotational speed of a motor drive mechanism provided for the constricting members is controlled by an electronic control unit, thereby forming the stuffed casing into sausages divided via the twisted portions.

With the apparatus for producing a twist in the stuffed casing by constricting the stuffed casing from both sides by the constricting members attached to the endless chains, in a case where it is desired to change a dividing interval (the interval of twisting positions=one link length) with respect to the stuffed casing so as to obtain sausages having a different link length, the operation of replacing the endless chains is required. Hence, the apparatus has shortcomings in terms of versatility.

Meanwhile, with the apparatus disclosed in Japanese Patent Application Laid-Open No. 268638/1990, the above-described problem can be solved by and large. However, since the constricting members are respectively attached to two rotating shafts, and the two rotating shafts are synchronously rotated in mutually opposite directions and are constricted so as to form sausages divided via the twisted portions. Therefore, the timing at which the rotating constricting members are brought into contact with the stuffed casing is determined and fixed by the distance between the two rotating shafts as well as the shapes of constricting portions of the rotating constricting members. The earlier the timing, the greater the directional difference between the direction of conveyance of the stuffed casing and the direction of movement of the constricting members. As a result, there is the risk that a force which damages the casing due to the constricting members may act on the stuffed casing. In addition, with the apparatus disclosed in the above-described publication, since the stuffed casing is constricted at a part of a locus of circular movement of the rotating constricting members, the constricting period is very short, with the result that there is the possibility that the occurrence of a twist becomes unreliable. Further, a conveying means for conveying the stuffed casing in its longitudinal direction is required, so that it is difficult to expect a large reduction in cost. Furthermore, since sausages of a desired link length are obtained by continuously changing the rotational speeds of the two rotating shafts with respect to the moving speed of the stuffed casing, if a deviation occurs in the speed adjustment, it is impossible to obtain sausages of a predetermined link length.

SUMMARY OF THE INVENTION

In view of the above-described circumstances, it is an object of the present invention to provide an apparatus which is capable of easily manufacturing sausages or the like having a desired link length without the replacement of component parts such as endless chains.

Another object of the present invention is to provide an apparatus for manufacturing sausages or the like having a desired link length, which is capable of setting, as desired, a constriction start timing and a constriction completion timing with respect to a stuffed casing, and is capable of producing a twist in a casing having a weak strength such as sheep intestines, collagen casings, or the like without causing damage thereto.

Still another object of the present invention is to provide an apparatus which is capable of easily manufacturing sausages or the like having a desired link length, which is capable of reliably and accurately producing twists in stuffed casing by constriction.

A further object of the present invention is to provide an apparatus which is capable of easily manufacturing sausages or the like having a desired link length even if a conveying means for conveying a stuffed casing in its longitudinal direction is not particularly provided on the downstream side of a rotating means.

A still further object of the present invention is to provide an apparatus which is capable of easily manufacturing sausages or the like having a desired link length by selectively specifying nipping means for effecting a constricting operation without performing troublesome speed adjustment.

In accordance with the present invention, the above objects are attained by an apparatus for manufacturing sausages or the like having a desired link length, comprising: rotating means for rotating a continuous stuffed casing, which has been stuffed with a raw material, about a longitudinal axis thereof; a plurality of nipping means which are arranged at predetermined intervals and are adapted to nip the stuffed casing from said rotating means; moving means for moving the nipping means such that the nipping means are moved together with the stuffed casing; and means for causing a predetermined one of the nipping means to effect a constricting operation with respect to the stuffed casing by fully closing the predetermined nipping means in association with the movement of the nipping means by the moving means.

In a preferred example of the above-described apparatus, the means for causing a constricted operation to be effected is provided with a rotating member for causing the predetermined nipping means to effect a constricting operation with respect to the stuffed casing by rotating, and means for continuously or intermittently rotating the rotating member in association with the movement of the nipping means. In another preferred example, the means for causing a constricted operation to be effected is provided with a reciprocating member for causing the predetermined nipping means to effect a constricting operation with respect to the stuffed casing by a reciprocating motion, and reciprocating means for reciprocating the reciprocating member in association with the movement of the nipping means. In addition, it is possible to cite as a preferred example in which the means for causing a constricting operation to be effected is provided with a cam portion.

The above described manufacturing apparatus may be further provided with means for causing the nipping means other than a predetermined one of the nipping means to effect a holding operation with respect to the stuffed casing by semi-closing the nipping means other than the predetermined one of the nipping means, or maintaining means for maintaining a fully closed state of the nipping means during the constricting operation.

In accordance with the present invention, the above objects are also attained by an apparatus for manufacturing sausages or the like having a desired link length, comprising: rotating means for rotating a continuous stuffed casing, which has been stuffed with a raw material, about a longitudinal axis thereof; a plurality of nipping means which are arranged at predetermined intervals and are adapted to nip the stuffed casing from the rotating means; moving means for moving the nipping means such that the nipping means are moved together with the stuffed casing; designating means for designating at a predetermined interval the nipping means which effect a constricting operation with respect to the stuffed casing; and means for causing the nipping means designated by the designating means to effect a constricting operation with respect to the stuffed casing by fully closing the designated nipping means.

In the present manufacturing apparatus having the designating means, in a preferred example, each of the nipping means is provided with a lever which is rotatable between a first position and a second position. In this case each of the nipping means is provided with a movable member which is capable of engaging the lever which has been rotated to the first position, and the designating means is provided with lever rotating means for designating the nipping means which is to effect a constricting operation, by rotating the lever to the first position. In addition, the present manufacturing apparatus may be arranged by further comprising: means for causing the nipping means other than the nipping means designated by the designating means to effect a holding operation with respect to the stuffed casing by semi-closing the nipping means other than the designated nipping means, or maintaining means for maintaining a fully closed state of the nipping means during the constricting operation.

In accordance with the present invention, the above objects are also attained by an apparatus for manufacturing sausages or the like having a desired link length, comprising: rotating means for rotating a continuous stuffed casing, which has been stuffed with a raw material, about a longitudinal axis thereof; nipping means for nipping the stuffed casing from the rotating means; circulatingly moving means for circulatingly moving the nipping means at a moving speed which is at a predetermined ratio with respect to a moving speed of the stuffed casing; and means for causing the nipping means which is circulatingly moved to effect a constricting operation with respect to the stuffed casing by fully closing the nipping means.

In the present apparatus having the circulatingly moving means, the means for causing a constricting operation to be effected may be provided with a cam for fully closing the nipping means, and the circulatingly moving means may be arranged to continuously or intermittently move the nipping means in a circulating manner. In a preferred example, the circulatingly moving means is arranged to linearly move the nipping means in an area where the constricting operation with respect to the stuffed casing is effected.

In the manufacturing apparatus according to any one of the above-described aspects of the present invention, the means for causing a constricting operation to be effected may be arranged to be capable of changing a fully-closing-operation start position of the nipping means and a fully-closing-operation completion position thereof. It should be noted that, in the present invention, the phrase "the fully closing of the nipping means" refers to a state of constriction with respect to the stuffed casing to such an extent that a twist can be produced in the stuffed casing.

As described above, in accordance with the present invention, sausages or the like having a desired link length can be easily produced without the replacement of component parts such as endless chains, twists in the stuffed casing by constriction can be produced reliably and accurately, and a conveying means for conveying a stuffed casing in its longitudinal direction need not be provided on the downstream side of a rotating means.

The above and other objects, features and advantages of the present invention will become more apparent from the following detailed description of the invention when read in conjunction with the accompanying drawings.

DESCRIPTION OF THE PREFERRED EMBODIMENTS

Figure 1:
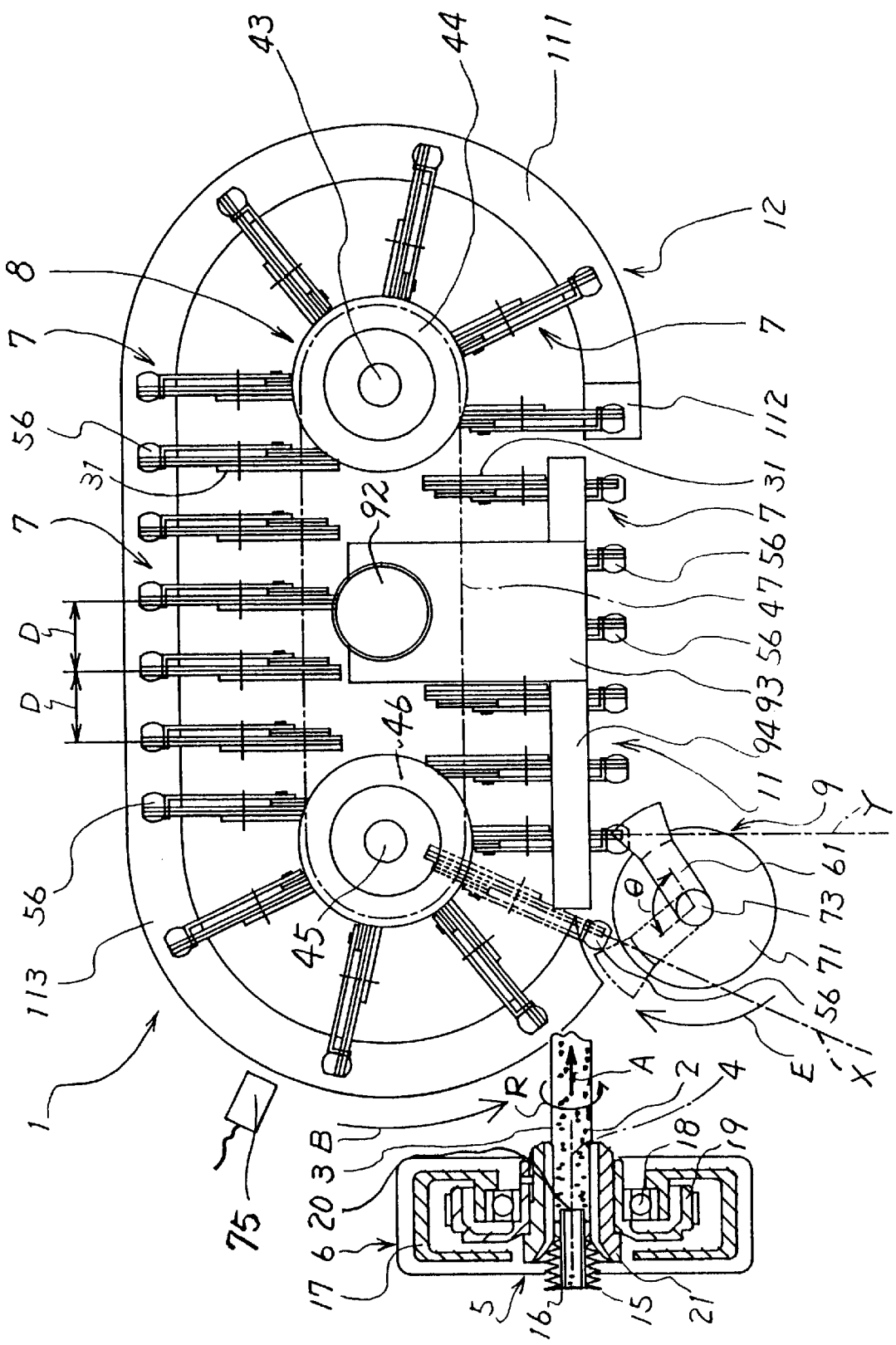
FIG. 1 is a plan view illustrating a preferred embodiment of the present invention.
Figure 2:
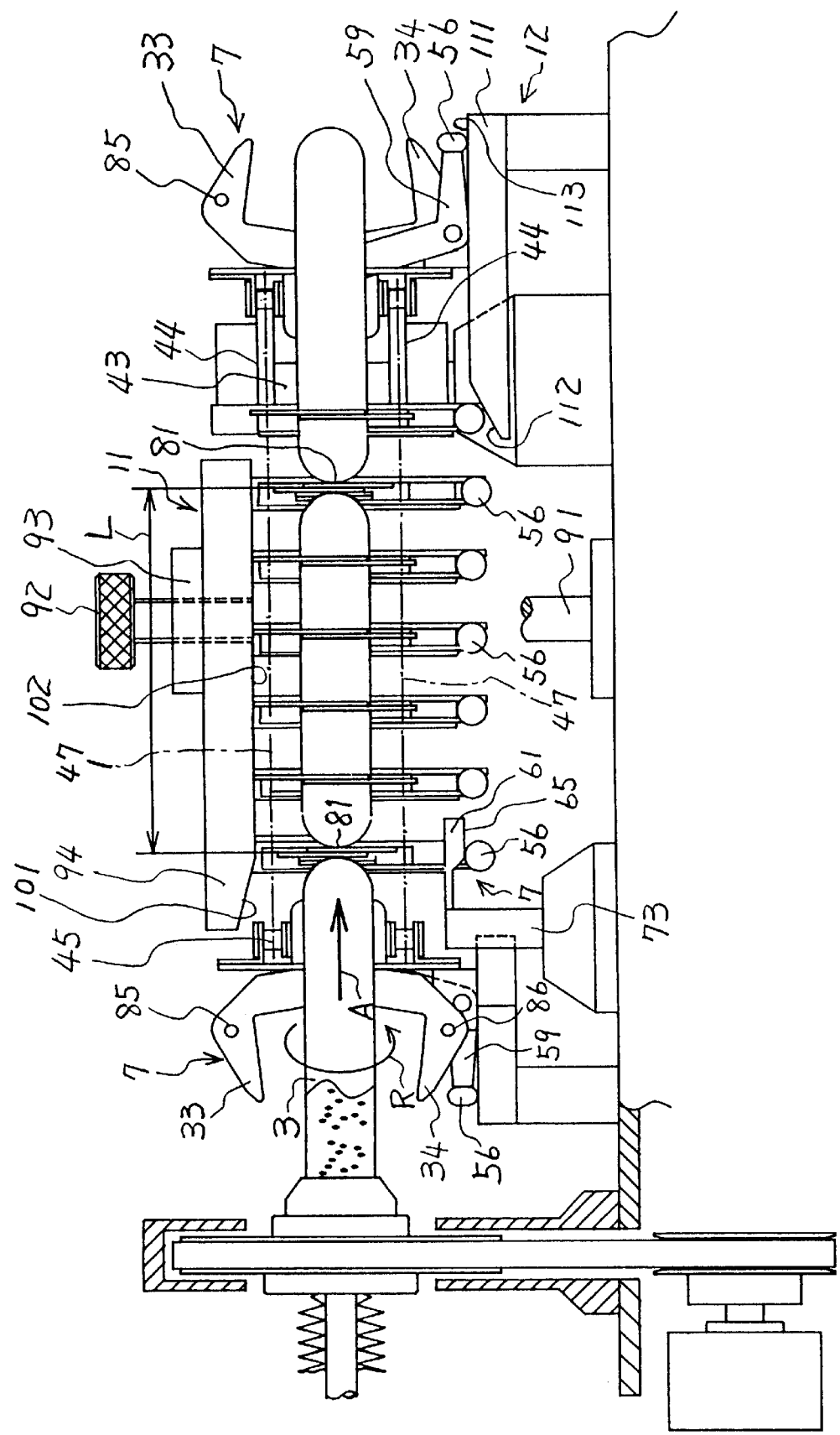
FIG. 2 is a front view illustrating the embodiment shown in FIG. 1.
Figure 3:
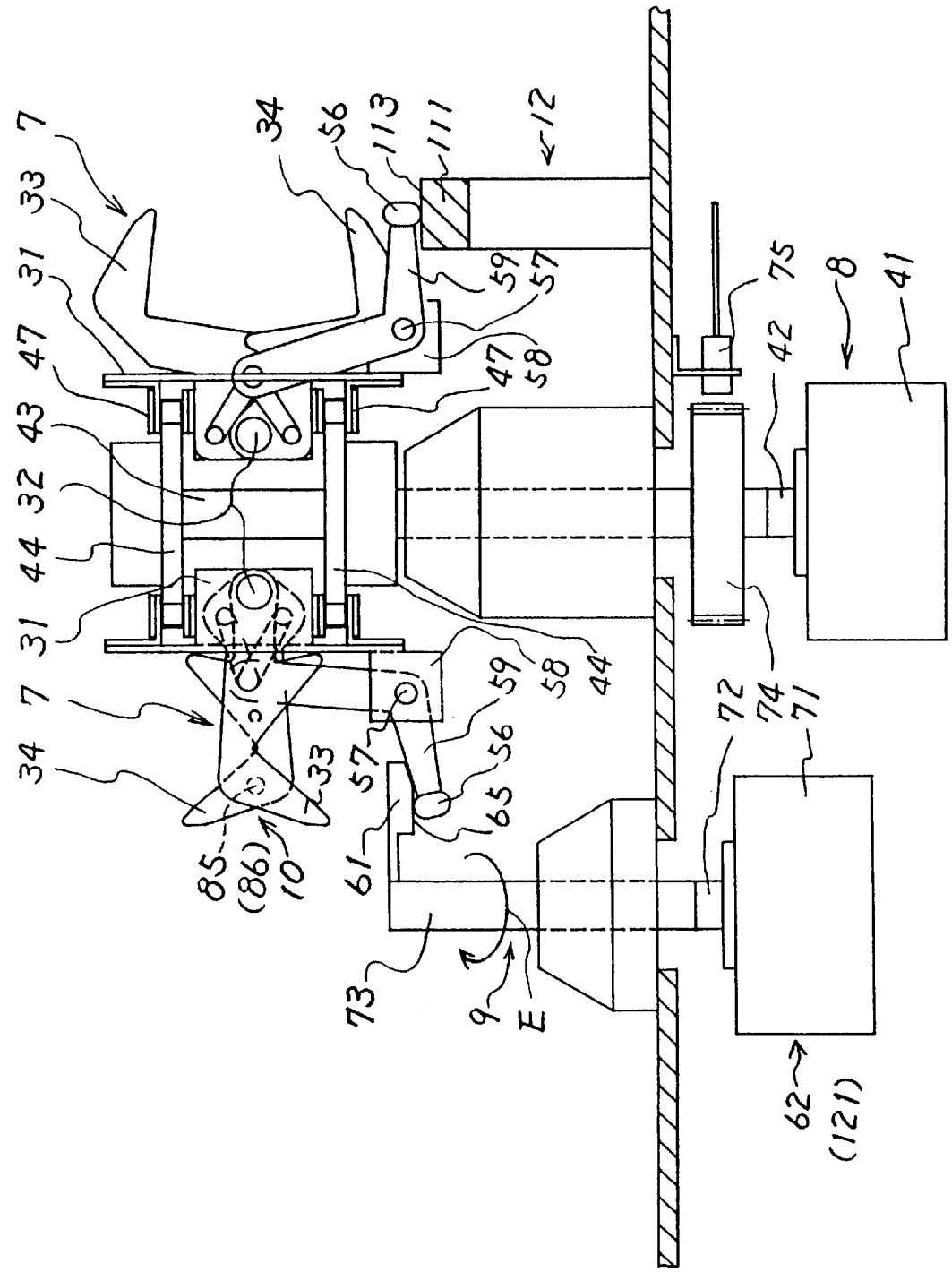
FIG. 3 is a side view illustrating the embodiment shown in FIG. 1.

Hereafter, a detailed description will be given of the embodiments of the present invention by citing an apparatus for manufacturing sausages, on the basis of the preferred embodiments illustrated in the drawings. It should be noted that the present invention is not limited to these embodiments.

In FIGS. 1 to 4, an apparatus 1 for manufacturing sausages having a desired link length in accordance with this embodiment is comprised of: a meat stuffing device 6 having a rotating means 5 for rotating a continuous stuffed casing 3 with meat 2 (serving as a raw material) stuffed therein, about its longitudinal axis 4 in the R direction; a plurality of nipping means 7 which are respectively arranged at predetermined intervals D so as to nip the stuffed casing 3 from the rotating means 5; a moving means 8 for moving the nipping means 7 in a circulating manner so that the nipping means 7 are moved in the circulating manner in the B direction in conjunction with the movement of the stuffed casing 3 in the A direction; a means 9 for causing predetermined nipping means 7 to effect a constricting operation with respect to the stuffed casing 3 by fully closing the predetermined nipping means 7 in association with the movement of the nipping means 7 in the B direction by the moving means 8; a maintaining means 10 for maintaining a fully closed state of the nipping means 7 undergoing the constricting operation; a means 11 for causing the nipping means 7 other than the predetermined nipping means 7 to effect a holding operation with respect to the stuffed casing 3 by semi-closing such nipping means 7 other than the predetermined nipping means 7; and a fully opening means 12 for fully opening the respective nipping means 7 at times other than in the holding operation and the constricting operation of the nipping means 7.

The meat stuffing device 6 is provided with the following: a rotating or non-rotating stuffing nozzle 16 over which a casing 15 which is not yet stuffed with the meat 2 is fitted; a toothed pulley 19 which is rotatably provided in a housing 17 via a bearing 18; a braking ring 21 which is secured to an inner surface of the toothed pulley 19 so as to brake the feeding out of the stuffed casing 3 from a discharge end 20 of the stuffing nozzle 16; an unillustrated meat supplying pump for continuously supplying the meat 2 into the stuffing nozzle 16; and a braking-ring rotating device 22 for rotating the braking ring 21 about the longitudinal axis 4 in the R direction via the pulley 19. The braking-ring rotating device 22 is provided with, among others, a variable-speed electric motor 23, a toothed pulley 24 attached to an output rotating shaft of the electric motor 23, and a timing belt 25 trained between the pulley 24 and the pulley 19. As the braking ring 21 is rotated about the longitudinal axis 4 in the R direction due to the operation of the braking-ring rotating device 22, the meat stuffing device 6 imparts to the stuffed casing 3 similar rotation about the longitudinal axis 4 in the R direction. As the meat supplying pump is operated, the meat stuffing device 6 stuffs the meat 2 into the casing 15 from the discharge end 20 of the stuffing nozzle 16. As the meat 2 is consecutively stuffed into the casing 15, the casing 15 fitted over the stuffing nozzle 16 is consecutively paid out from the discharge end 20, thereby feeding out the stuffed casing 3 toward the nipping means 7. Thus, in this example, the rotating means 5 for rotating the stuffed casing 3 about its longitudinal axis 4 is formed by the braking-ring rotating device 22 and the braking ring 21.

Each nipping means 7 is provided with the following: a pair of nipping members 33 and 34 which are attached to an upright portion 30 of a bracket 31 in such a manner as to be rotatable in the C directions via a shaft 32; link members 53 and 54 whose one ends are rotatably connected to the nipping members 33 and 34, respectively, by means of shafts 51 and 52; and an arm member 59 whose one end is rotatably connected to the other ends of the link member 53 and 54 by means of a common shaft 55, a roller 56 being attached to the other end of the arm member 59, an intermediate portion of the arm member 59 being rotatably supported by another upright portion 58 of the bracket 31 by means of a shaft 57. Each of the nipping members 33 and 34 is provided with a nipping portion 36 having a V-shaped notch 35. As for each nipping means 7, as the arm member 59 rotates in the F direction, the nipping members 33 and 34 are rotated toward each other in the C directions by means of the link members 53 and 54 and nip the stuffed casing 3 at the nipping portions 36. When the nipping portions 36 are fully closed (in the case shown on the left-hand side in FIG. 3), the stuffed casing 3 is constricted. Meanwhile, when the nipping portions 36 are semi-closed (in the case shown in FIG. 4), the stuffed casing 3 is held. Incidentally, as the nipping members 33 and 34 are rotated in the C directions in such a manner as to move away from each other, the nipping portions 36 are fully opened as shown on right side in FIG. 3.

Incidentally, although a common shaft is used as the shaft 32 for rotatably supporting the nipping members 33 and 34, the supporting members 33 and 34 may be rotatably supported by different shafts, respectively. In addition, if the shafts for rotatably supporting the supporting members 33 and 34, respectively, are disposed by being spaced apart from each other appropriately, it is possible to reduce the variations in the nipping center and hold the stuffed casing 3 appropriately irrespective of the relative size of the diameter of the stuffed casing 3. Further, the shaft 32 may be supported in a floating manner in such a manner as to be movable in a direction which connects the axis of the shaft 32 and the longitudinal axis 4.

The moving means 8 is provided with the following: an electric motor 41; a pair of drive-side sprocket wheels 44 attached to a rotating shaft 43 connected to an output rotating shaft 42 of the electric motor 41; a pair of driven-side sprocket wheels 46 attached to a rotating shaft 45; and a pair of endless chains 47 trained between the sprocket wheels 44 and 46. The brackets 31 are attached to the endless chains 47 at equal intervals. As the electric motor 41 is operated to rotate the sprocket wheels 44, and the rotation of the sprocket wheels 44 causes the endless chains 47 to travel in the B direction, whereby the respective nipping means 7 are moved in a circulating manner in the B direction.

The means 9 for causing a constricting operation to be effected is provided with the following: a rotating member 61 which rotates in the E direction and comes into contact and engagement with the roller 56 of the arm member 59 provided for the predetermined nipping means 7 so as to rotate the arm member 59 in the F direction, which in turn causes the nipping members 33 and 34 of the predetermined nipping means 7 to rotate toward each other in the C directions by means of the link members 53 and 54 so as to fully close the nipping portions 34, thereby causing the predetermined nipping means 7 to effect a constricting operation with respect to the stuffed casing 3; and a continuously rotating means 62 for continuously rotating the rotating member 61 in association with the movement of the nipping means 7. The rotating member 61 has at a lower surface of its distal end a cam surface 65 serving as a cam portion. As the roller 56 of the arm member 59 provided for the predetermined nipping means 7 is brought into contact and engagement with the cam surface 65 so as to be guided downward, which in turn causes the arm member 59 to rotate about the shaft 57 in the F direction, thereby fully closing the nipping portions 36 of the predetermined nipping means 7.

The continuously rotating means 62 is provided with the following: an electric motor 71; a rotating shaft 73 which is connected to an output rotating shaft 72 of the electric motor 71, and to which the rotating member 61 is attached; a detector 75 for detecting the rotation of a disk 74 attached to the shaft 43, i.e., the movement of the nipping means 7, in response to teeth formed on an outer periphery of the disk 74; and a controller (not shown) for operating the electric motor 71 in response to a detection signal from the detector 75 in association with the operation of the electric motor 41. Under control by the controller on the basis of the detection signal from the detector 75, the continuously rotating means 62 operates the electric motor 71 to continuously rotate the rotating member 61 such that the cam surface 65 of the rotating member 61 is engaged with the roller 56 of the arm member 59 provided for the predetermined nipping means 7, so as to form a twisted portion 81 in the stuffed casing 3 at a predetermined interval L (corresponding to one link length; approximately an integer multiple of the interval D). Incidentally, as shown in FIG. 1, the detector 75 may be provided in such a manner as to directly detect the movement of the nipping means 7, and the electric motor 71 may be operated by the detection signal from the detector 75 which directly detects the movement of the nipping means 7.

In both cases where the predetermined interval L is long and short, the rotating member 61 is rotated continuously with its speed controlled by the continuously rotating means 62 such that the rotating member 61 moves in a predetermined range of the rotational angle $\theta$ with respect to the predetermined nipping means 7 which moves from a fully-closed-operation start position X to a fully-closed-operation completion position Y.

The maintaining means 10 is constituted by permanent magnets 85 and 86 which are respectively attached to portions of the nipping members 33 and 34 which are superposed on each other when the nipping members 33 and 34 are fully closed. The maintaining means 10 maintains the fully closed state of the nipping members 33 and 34 by means of the respective magnetic forces of the permanent magnet 85 attached to the nipping member 33 and the permanent magnet 86 attached to the nipping member 34.

Figure 4:
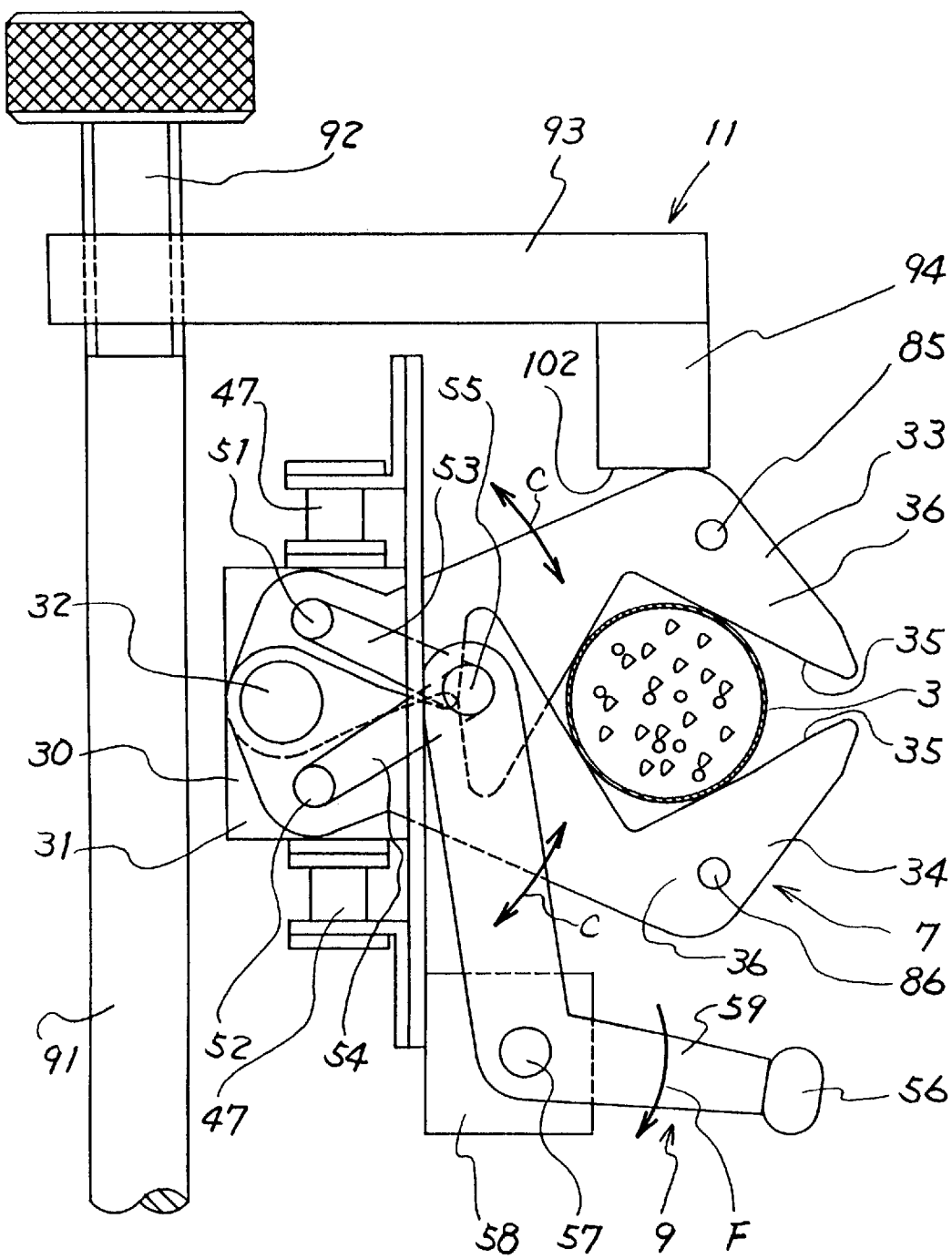
FIG. 4 is a partial enlarged view illustrating the embodiment shown in FIG. 1.

The means 11 for causing a holding operation to be effected is provided with a column 91, a bracket 93 attached to the column 91 by means of an adjust screw 92, and an elongated cam member 94 attached to the bracket 93 and extending along the linear moving path of the nipping means 7. The vertical position of the bracket 93 can be adjusted by rotating the adjust screw 92, whereby the semi-closed size of the nipping means 7 other than the predetermined nipping means 7 can be adjusted in correspondence with the diameter of the stuffed casing 3. The cam member 94 has at its lower surface a cam portion which includes a leading cam surface 101 and a main cam surface 102 continuing from the leading cam surface 101. As an upper end of the nipping member 33 of the nipping means 7 other than the predetermined nipping means 7 is brought into contact and engagement with the leading cam surface 101 and then the main cam surface 102, the cam member 94 rotates the relevant nipping member 33 toward the nipping member 34 in the C direction, and concurrently rotates the nipping member 34 toward the relevant nipping member 33 in the C direction by means of the link members 53 and 54. As a result, the cam member 94 sets the nipping means 7 other than the predetermined fully-closed nipping means 7 in a semi-closed state, as shown in FIG. 4, and moves the stuffed casing 3 in the A direction while holding the same.

The fully opening means 12 has an elongated cam member 111 extending along the moving path of the nipping means 7 from a terminating end of the elongated cam member 94 to the vicinity of the rotating member 61. The cam member 111 has at its upper surface a cam portion which includes a leading cam surface 112 and a main cam surface 113 continuing from the leading cam surface 112. The fully opening means 12 causes both the roller 56 of the arm member 59 in the nipping means 7, which completed a holding operation by the means 11 for causing a holding operation to be effected, and the roller 56 of the arm member 59 in the nipping means 7, which is set in the fully closed state by the maintaining means 10, to consecutively run onto the leading cam surface 112 and the leading cam surface 112 together with the movement of the rollers 56 in the B direction, so as to rotate these arm members 59. As a result, the fully opening means 12 consecutively sets the nipping portions 36 of the nipping means 7 in the fully open state, and consecutively cancels the constricting operation and the holding operation by the nipping means 7 with respect to the stuffed casing 3. Subsequently, each nipping means 7 is set in the fully open state by the fully opening means 12 up to the vicinity of the rotating member 61, and is moved in the B direction.

With the above-described apparatus 1 for manufacturing sausages, when the rotating member 61 is selectively engaged with the roller 56 of the predetermined nipping means 7, and the nipping portions 36 of the relevant predetermined nipping means 7 are set in the fully closed state, the stuffed casing 3 fed out from the meat stuffing device 6 is nipped and constricted by the nipping members 33 and 34. The stuffed casing 3, which is rotated by the rotating means 5 on the upstream side of this constricting portion, and is held by the nipping members 33 and 34 which have been set in the semi-open state by the means 11 for causing a holding operation to be effected on the downstream side of the constricting position, is twisted at the relevant constricting position, and the twisted portion 81 is formed there. When the rotating member 61 is engaged with the roller 56 of, for instance, every fifth nipping means 7, and the nipping portions 36 of every fifth nipping means 7 are set in the fully closed state, the twisted portions 81 with the link length L of 5D are consecutively formed in the stuffed casing 3 fed out from the meat stuffing device 6.

In a case where sausages with a link length L which is shorter or longer than, for instance, 5D, it suffices to increase or decrease the rotation of the rotating member 61. In either case, it suffices if the rotational speed of the rotating member 61 is adjusted to the moving speed of the nipping means 7 in the predetermined range of the rotational angle $\theta$ such that the contact and engagement between the roller 56 and the cam surface 65 of the rotating member 61 and cancellation thereof are effected at the predetermined positions X and Y.

As described above, with the apparatus 1 for manufacturing sausages, since the rotating member 61 is selectively brought into contact and engagement with the rollers 56 of the predetermined nipping means 7, it is possible to easily manufacture sausages having a desired link length L without the replacement of component parts such as the endless chains, and it is possible to reliably and accurately produce twists in the stuffed casing 3 by constriction. In addition, since the stuffed casing 3 is moved in the direction A while being held with the nipping means 7 other than the predetermined nipping means 7 set in the semi-open state, the conveying means for conveying the stuffed casing 3 in such a manner as to hamper the rotation of its longitudinal axis 4 need not be particularly provided on the downstream side of the rotating means 5. Moreover, the nipping means 7 for effecting the constricting operation can be selectively specified without conducting troublesome speed adjustment.

Although, in the above, the rotating member 61 is rotated continuously, the rotating member 61 may be instead rotated intermittently in association with the movement of the nipping means 7 in the B direction. In this case, the continuously rotating means 62 may be formed by an intermittently rotating means 121. That is, an arrangement may be provided such that, by means of the intermittently rotating means 121, the rotation of the rotating member 61 is temporarily stopped until the arrival of the nipping means 7 whose nipping portions 36 are to be set in the fully closed state, the rotation of the rotating member 61 is immediately started upon its arrival (at the position X), the rotating member 61 is rotated in the predetermined range of the rotational angle θ at the aforementioned rotational speed of the rotating member 61, and the rotating member 61 is subsequently rotated up to the aforementioned stop position at the same speed. The rotating member 61 may be rotated at high speed, as required, outside the predetermined range of the rotational angle θ.

Figure 5:
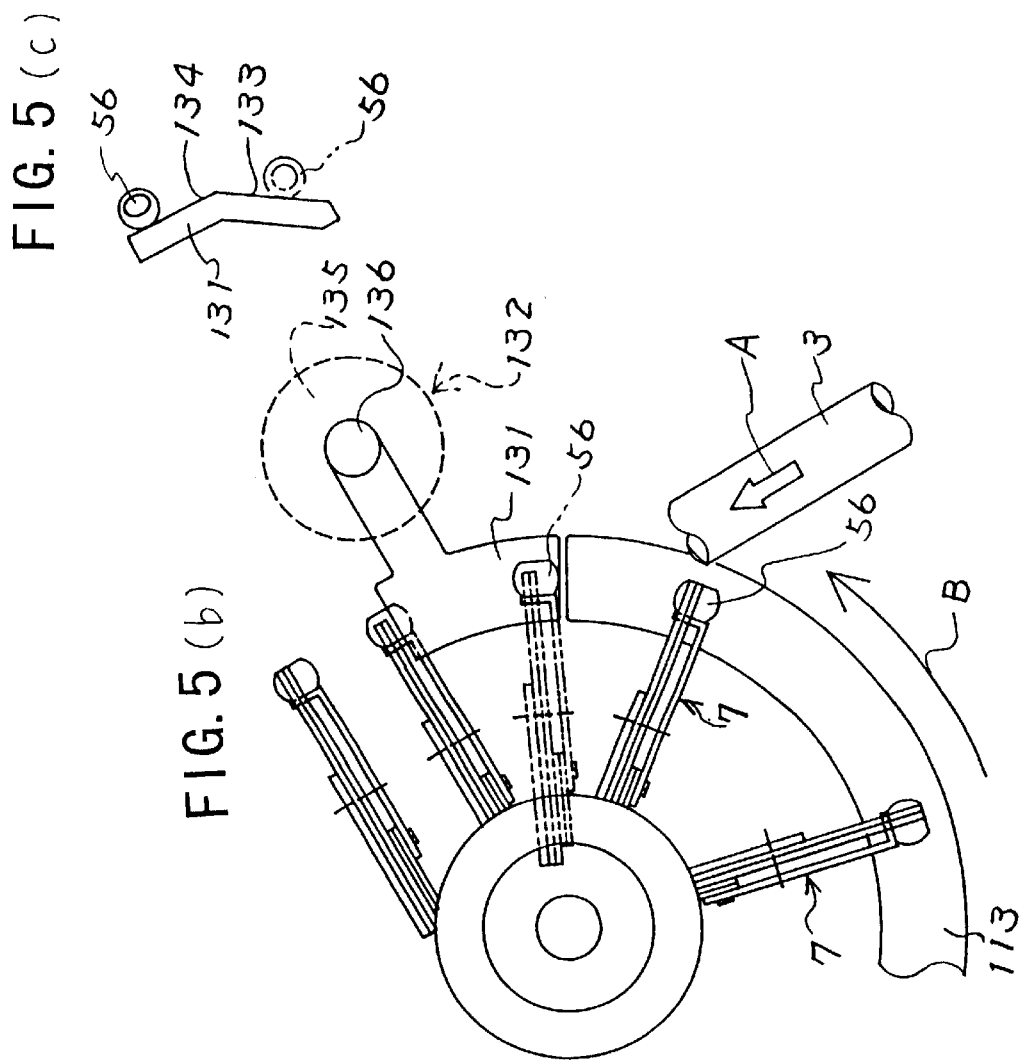
FIG. 5 is a partial view illustrating another preferred embodiment of the present invention.

In addition, as shown in the parts (a), (b), and (c) of FIG. 5, the means 9 for causing a constricting operation to be effected may be formed by comprising: a reciprocating member 131 for causing the predetermined nipping means 7 to effect a constricting operation with respect to the stuffed casing 3 through a reciprocating motion in the G directions (vertical direction); and a reciprocating means 132 for reciprocating the reciprocating member 131 in association with the movement of the nipping means 7 in the B direction. The reciprocating member 131 has at its lower surface a cam portion which includes a leading cam surface 133 and a main cam surface 134 continuing from the leading cam surface 133, and the cam portion is formed in a substantially V-shaped longitudinal section. The reciprocating means 132 has an air cylinder 135, and the reciprocating member 131 is attached to a piston rod 136 of the air cylinder 135. As the piston rod 136 is extended and retracted in the G directions due to the actuation of the air cylinder 135, the reciprocating member 131 is reciprocated in the G directions.

In the parts (a), (b) and (c) of FIG. 5, upon arrival of the predetermined nipping means 7 whose nipping portions 36 are to be set in the fully closed state, the reciprocating member 131 is lowered by the actuation of the air cylinder 135. As a result, the roller 56 of the arm member 59 of the predetermined nipping means 7 is brought into contact and engagement with the leading cam surface 133 and is led downward, and is then brought into contact and engagement with the main cam surface 134. Thus, the arm member 59 is rotated, and the nipping portions 36 are set in the fully closed state and nip and constrict the stuffed casing 3, thereby producing the twisted portion 81 in the stuffed casing 3 at this constricted position. After passage of the roller 56 from the main cam surface 134, the air cylinder 135 is operated reversely to raise the reciprocating member 131. As a result, the roller 56 of the arm member 57 in the nipping means 7 other than the predetermined nipping means 7 passes the lower surface of the reciprocating member 131 without engaging the leading cam surface 133 of the reciprocating member 131. As for the nipping means 7 other than the predetermined nipping means 7, their nipping portions 33 engage the cam member 94 of the means 11 for causing a holding operation to be effected, so that the nipping portions 33 are set in the semi-open state and move in the B direction. Meanwhile, the predetermined nipping means 7 move in the B direction in a state in which the fully closed state of the nipping portions 36 is maintained up to a predetermined position by the maintaining means 10.

Figure 6:
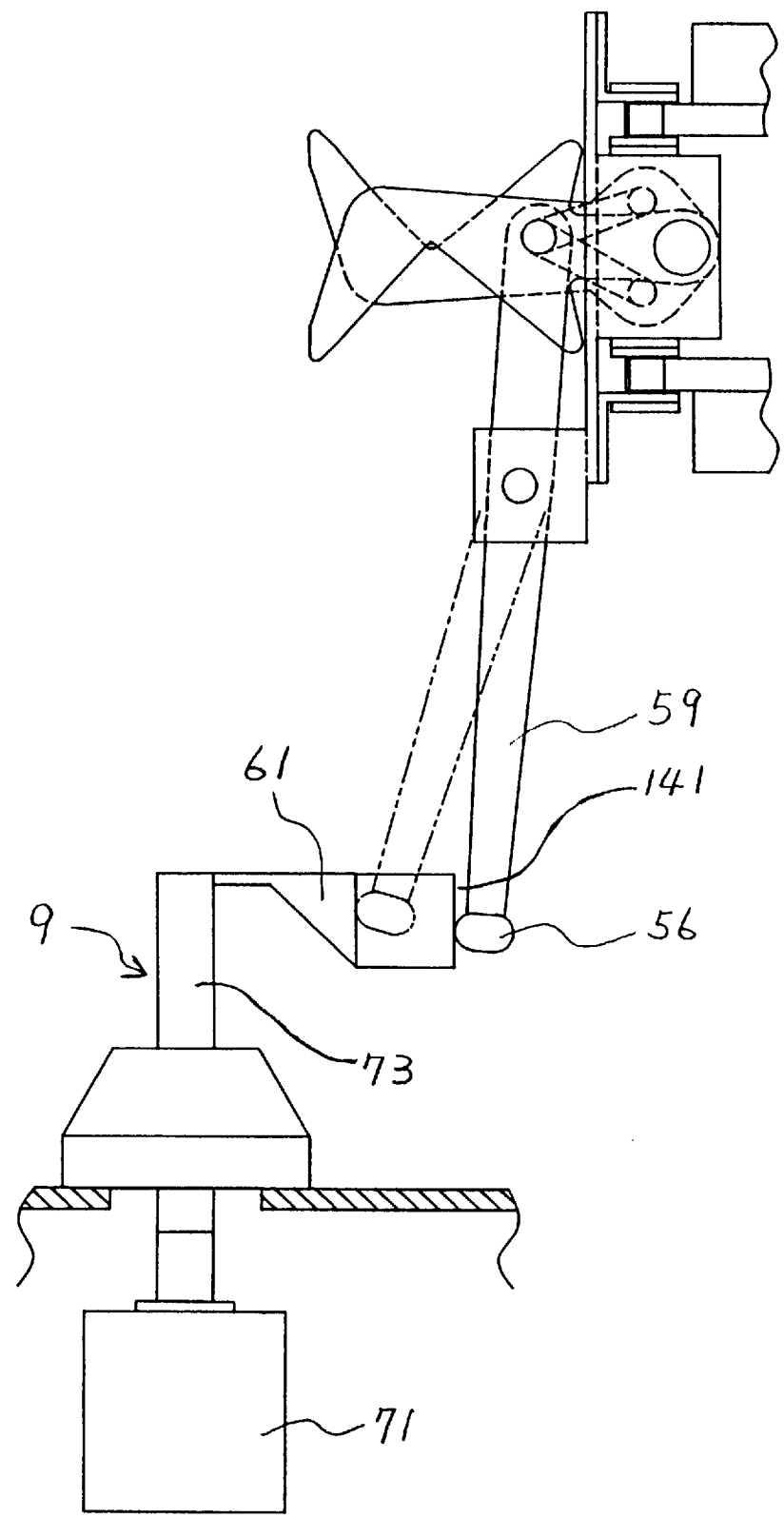
FIG. 6 is a partial view illustrating still another preferred embodiment of the present invention.
Figure 7:
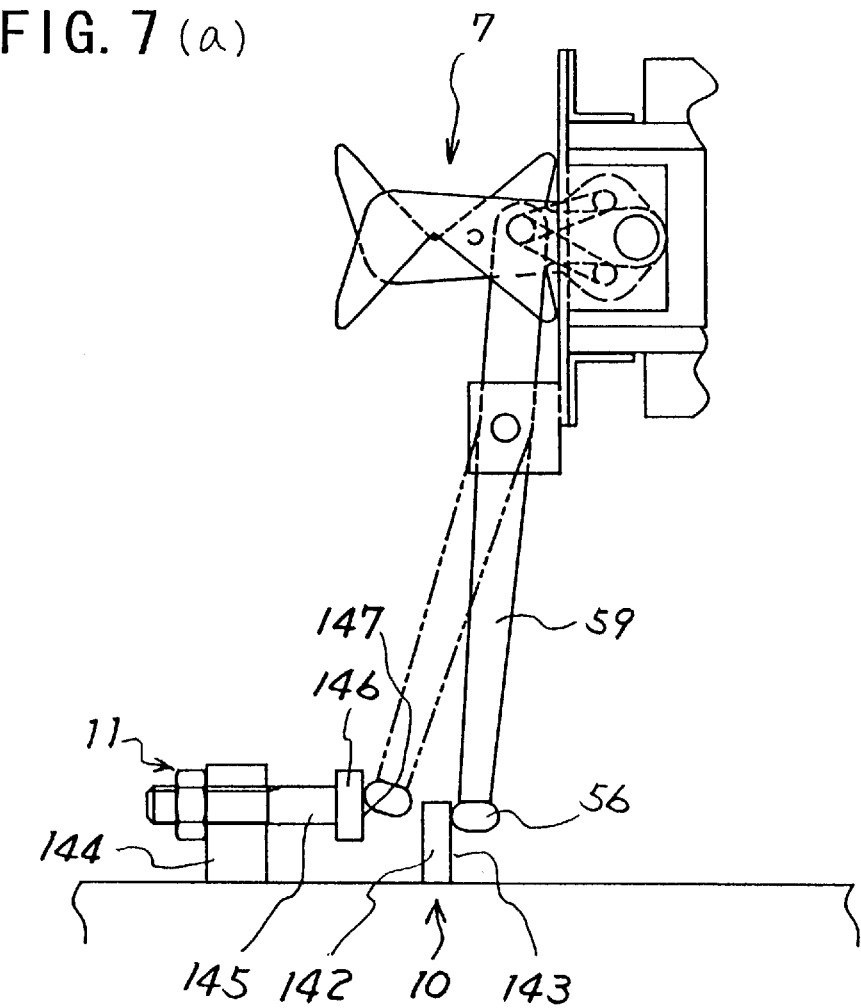
FIG. 7 is a partial view illustrating a further preferred embodiment of the present invention.
Figure 7:
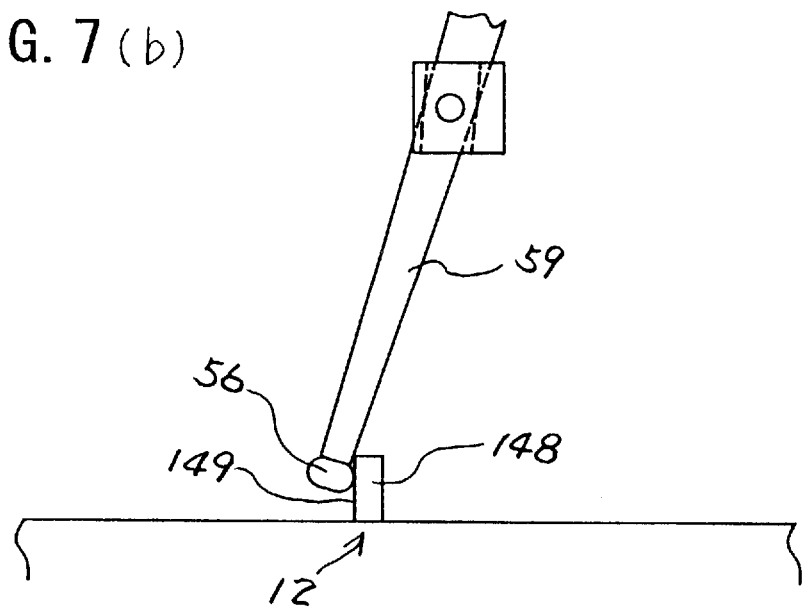

Although, in the above, a member which is bent in an L shape is used as the arm member 59, the arm member 59 may be formed by using a straight member, such as the one shown in FIG. 6 and the parts (a) and (b) of FIG. 7, and the rotating member 61 of the means 9 for causing a constricting operation to be effected, the maintaining means 10, the means 11 for causing a holding operation to be effected, and the fully opening means 12 may be formed correspondingly. The rotating member 61 of the means 9 for causing a constricting operation to be effected, which is shown in FIG. 6, is attached to the shaft 73 which is rotated by the electric motor 71. The rotating member 61 has at its side surface a cam portion which is formed by a cam surface 141 for engagement with the roller 56. The maintaining means 10 shown in the part (a) of FIG. 7 has a cam member 142 which is provided in such a manner as to extend along the linear moving path of the nipping means 7 in the same way as the aforementioned cam member 94. The cam member 142 has at its side surface a cam portion which is formed by a cam surface 143 for engagement with the roller 56.

The means 11 for causing a holding operation to be effected, which is similarly shown in the part (a) of FIG. 7, has an elongated cam member 146 which is attached to a support plate 144 by means of an adjust screw 145 in such a manner as to extend along the linear moving path of the nipping means 7. The cam member 146 has at its side surface a cam portion which is formed by a cam surface 147 for engagement with the roller 56. The fully opening means 12 shown in the part (b) of FIG. 7 is formed by an elongated cam member 148 extending along the linear moving path of the nipping means 7 from a terminating end of the elongated cam member 94 to the vicinity of the rotating member 61 in the same way as the cam member 111. The cam member 148 has at its side surface a cam portion which is formed by a cam surface 149 for engagement with the roller 56.

In the movement of the nipping means 7 in the B direction, the roller 56 of the arm member 59 is consecutively brought into contact and engagement with each of the rotating member 61 having the cam surface 141, the cam member 142 having the cam surface 143, the cam member 146 having the cam surface 147, and the cam member 148 having the cam surface 149, which are shown in FIG. 6 and the parts (a) and (b) of FIG. 7. Thus it is possible to cause the predetermined nipping means 7 to effect the constricting operation with respect to the stuffed casing 3, maintain the fully closed state of the nipping portions 36 of the predetermined nipping means 7, set the nipping portions 36 of the nipping means 7 other than the predetermined nipping means 7 in the semi-open state, and set the nipping portions 36 of the nipping means 7 in the fully open state.

Figure 8:
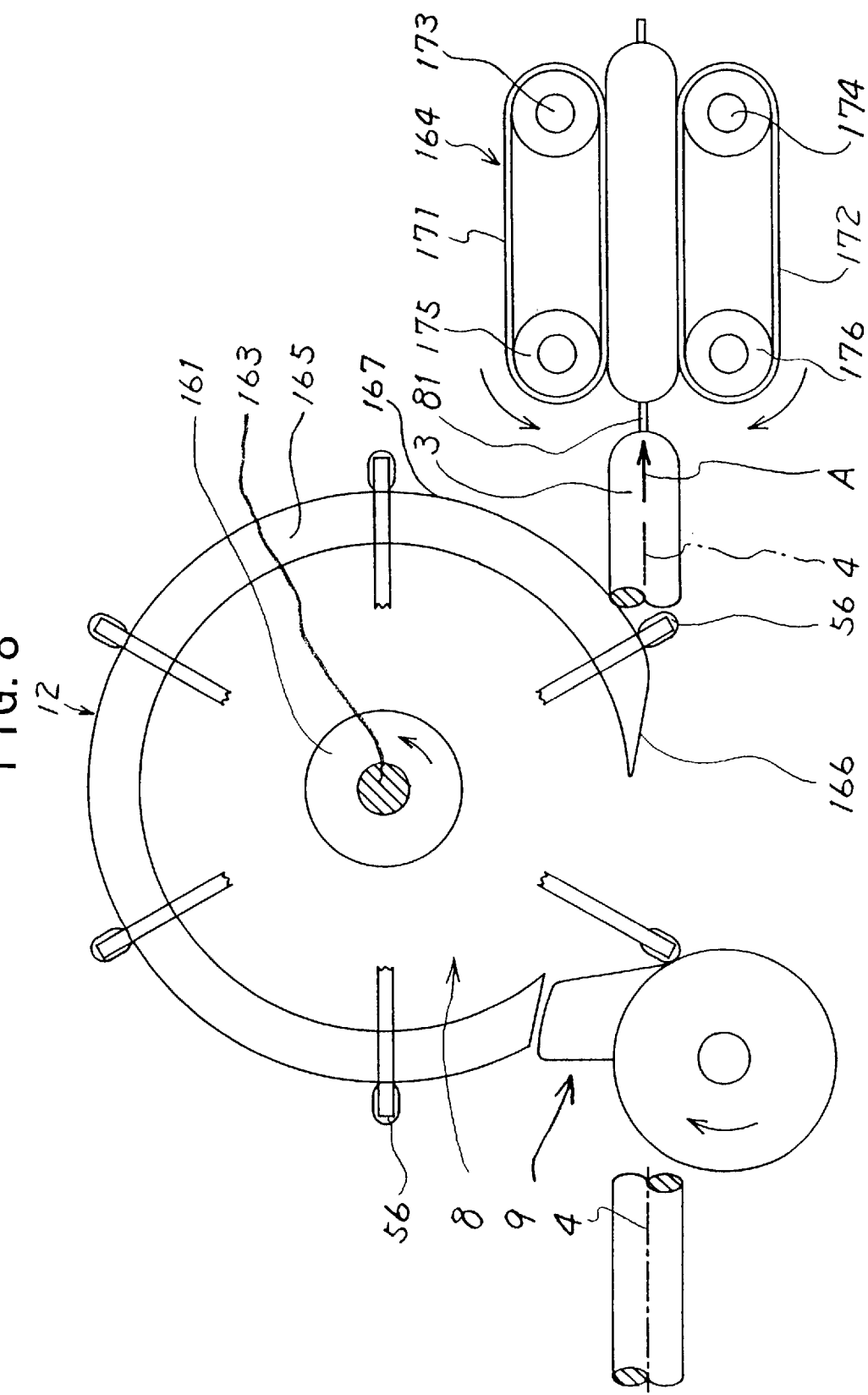
FIG. 8 is a plan view illustrating a still further preferred embodiment of the present invention.
Figure 9:
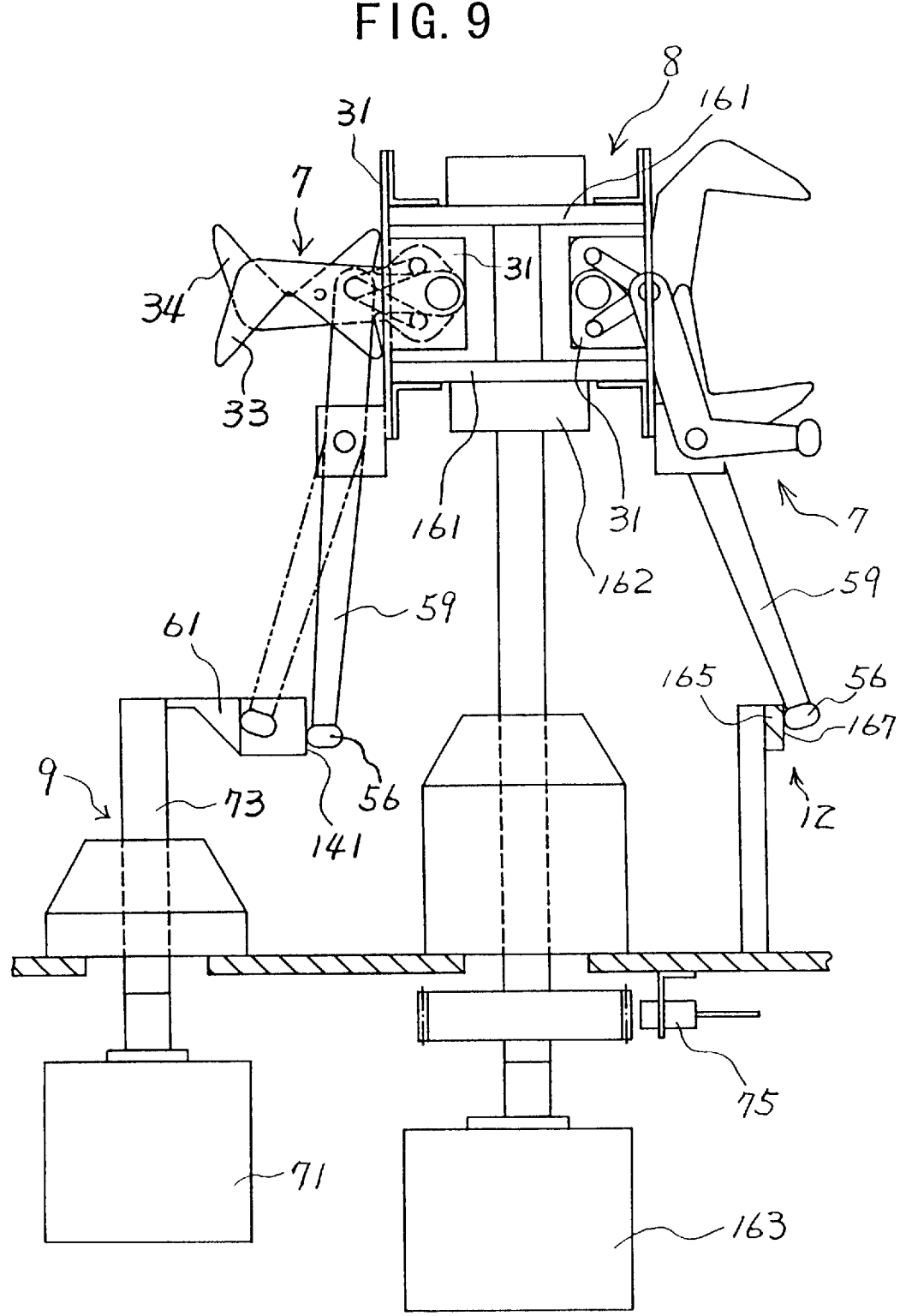
FIG. 9 is a side view illustrating the embodiment shown in FIG. 8.

In the above, the moving means 8 for moving the nipping means 7 in a circulating manner is comprised of the sprocket wheels 44 and 46, the endless chains 47, and the like. The arrangement provided is such that, in the moving path where the nipping means 7 are linearly moved, the nipping means 7 other than the predetermined nipping means 7 are semi-closed by the means 11 for causing a holding operation to be effected, and the nipping means 7 other than the predetermined nipping means 7 are made to effect the holding operation with respect to the stuffed casing 3 so as to hold the stuffed casing 3 on the downstream side of the constricting portion such that the stuffed casing 3 does not rotate about its longitudinal axis 4. At the same time, the stuffed casing 3 is conveyed in the A direction. However, as shown in FIGS. 8 and 9, the moving means 8 for moving the nipping means 7 in a circulating manner may be comprised of a pair of disks 161 and an electric motor 163 for rotating a shaft 162 to which the disks 161 are attached. In addition, the stuffed casing 3 may be held such that the stuffed casing 3 does not rotate about its longitudinal axis 4, and the means for conveying the stuffed casing 3 in the A direction may be embodied by a conveying device 164 which is separately provided on the downstream side of the moving means 8.

In FIGS. 8 and 9, the nipping means 7 which are attached to the disks 161 at equal intervals in the peripheral direction by means of the brackets 31 are circulatingly moved in a circular motion as the disks 161 are rotated by the operation of the electric motor 163. The means 9 for causing each nipping means 7 having the straight arm member 59 to effect a constricting operation is constructed in the same manner as the one shown in FIG. 6. The fully opening means 12 has a semi-annular cam member 165 provided along the circular circulatingly moving path of the nipping means 7. The cam member 165 has at its side surface a cam portion which includes a leading cam surface 166 and a main cam surface 167 continuing from the leading cam surface 166. As the roller 56 of the arm member 59 is brought into contact and engagement with the leading cam surface 166 and then the main cam surface 167, the nipping portions 36 of each nipping means 7 are set in the fully opened state. Incidentally, the predetermined nipping means 7 whose nipping portions 36 are set in the fully open state by the fully opening means 12 is set in the fully closed state by the means 9 for causing a constricting operation to be effected. However, since the period from the time this fully closed state is canceled by the fully opening means 12 until the nipping means 7 is set again in the fully open state is short, the maintaining means 10 having the permanent magnets or the cam member, as described above, need not be provided.

The conveying device 164 shown in FIG. 8 is provided with a pair of endless belts 171 and 172 disposed in face-to-face relation in the horizontal direction, drive-side and driven-side pulleys 173, 174, and 175, 176 between which the endless belts 171 and 172 are trained, and a rotatively driving device (not shown) constituted by an electric motor for rotating the drive-side pulleys 173 and 174 in synchronism with each other in mutually opposite directions. The arrangement provided is such that the stuffed casing 3 with the twisted portions 81 formed therein is nipped by the endless belts 171 and 172, is held in such a manner as not to rotate about its longitudinal axis 4, and is conveyed in the A direction.

Figure 10:
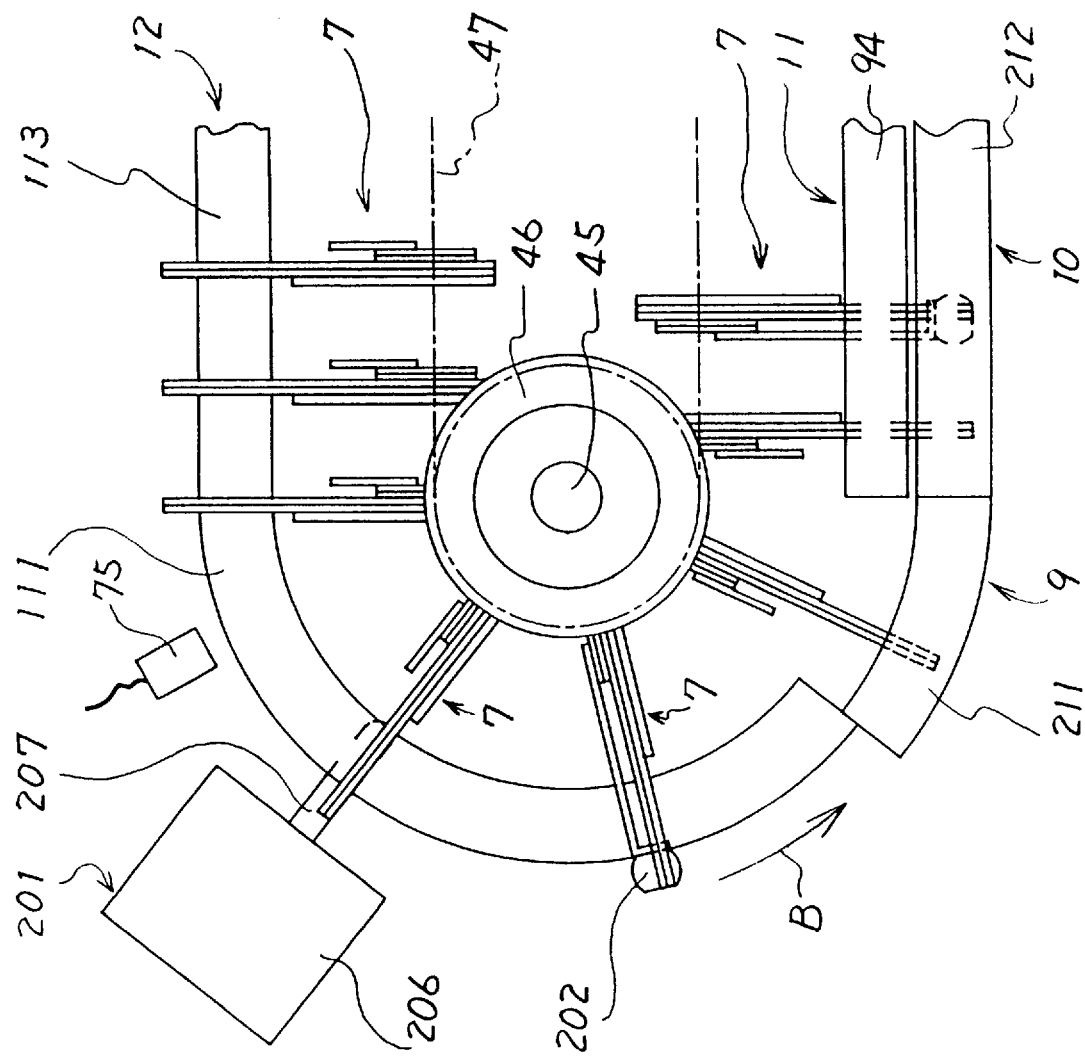
FIG. 10 is a partial plan view illustrating a further preferred embodiment of the present invention.
Figure 11:
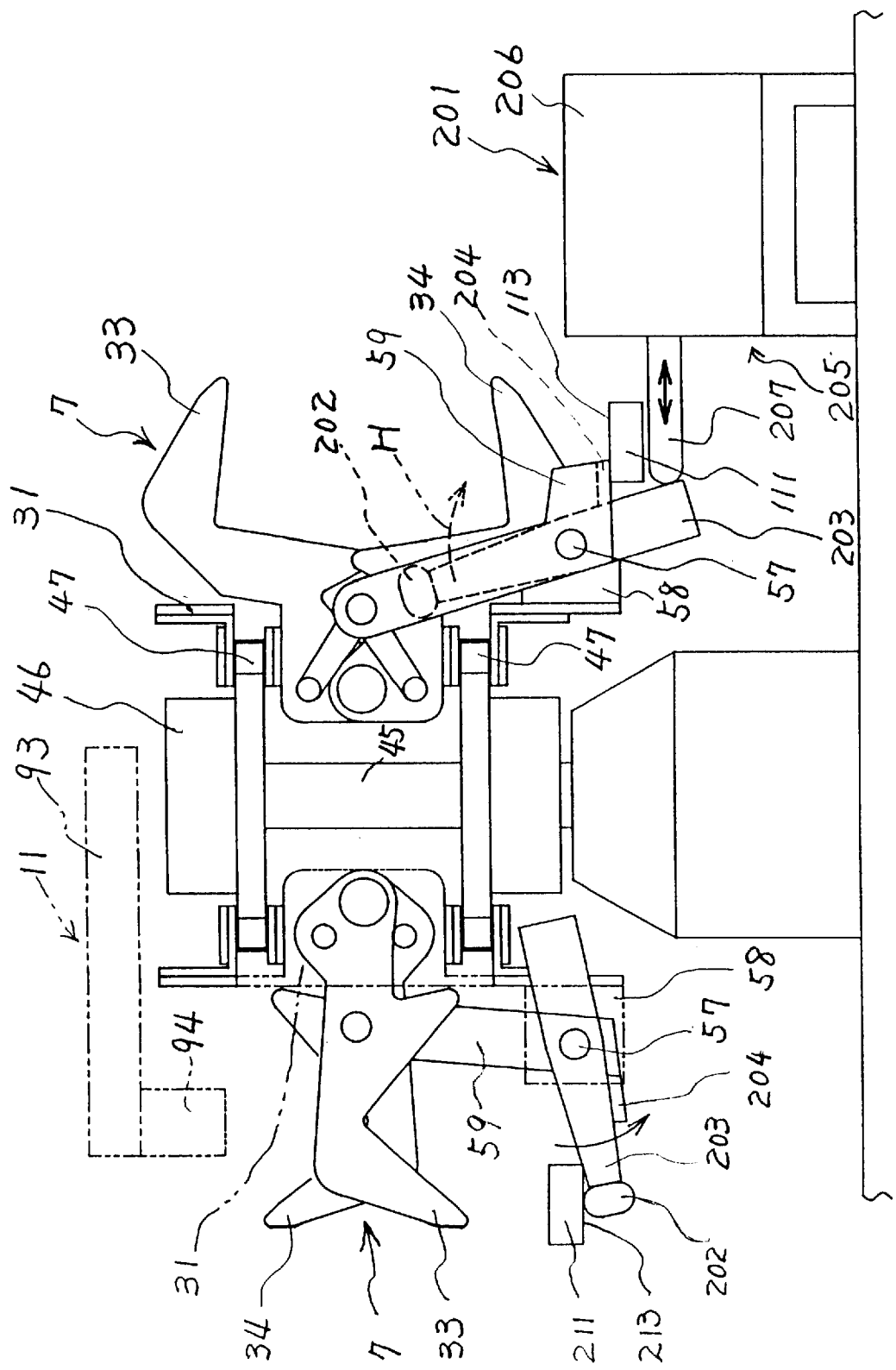
FIG. 11 is a side view illustrating the embodiment shown in FIG. 8.
Figure 12:
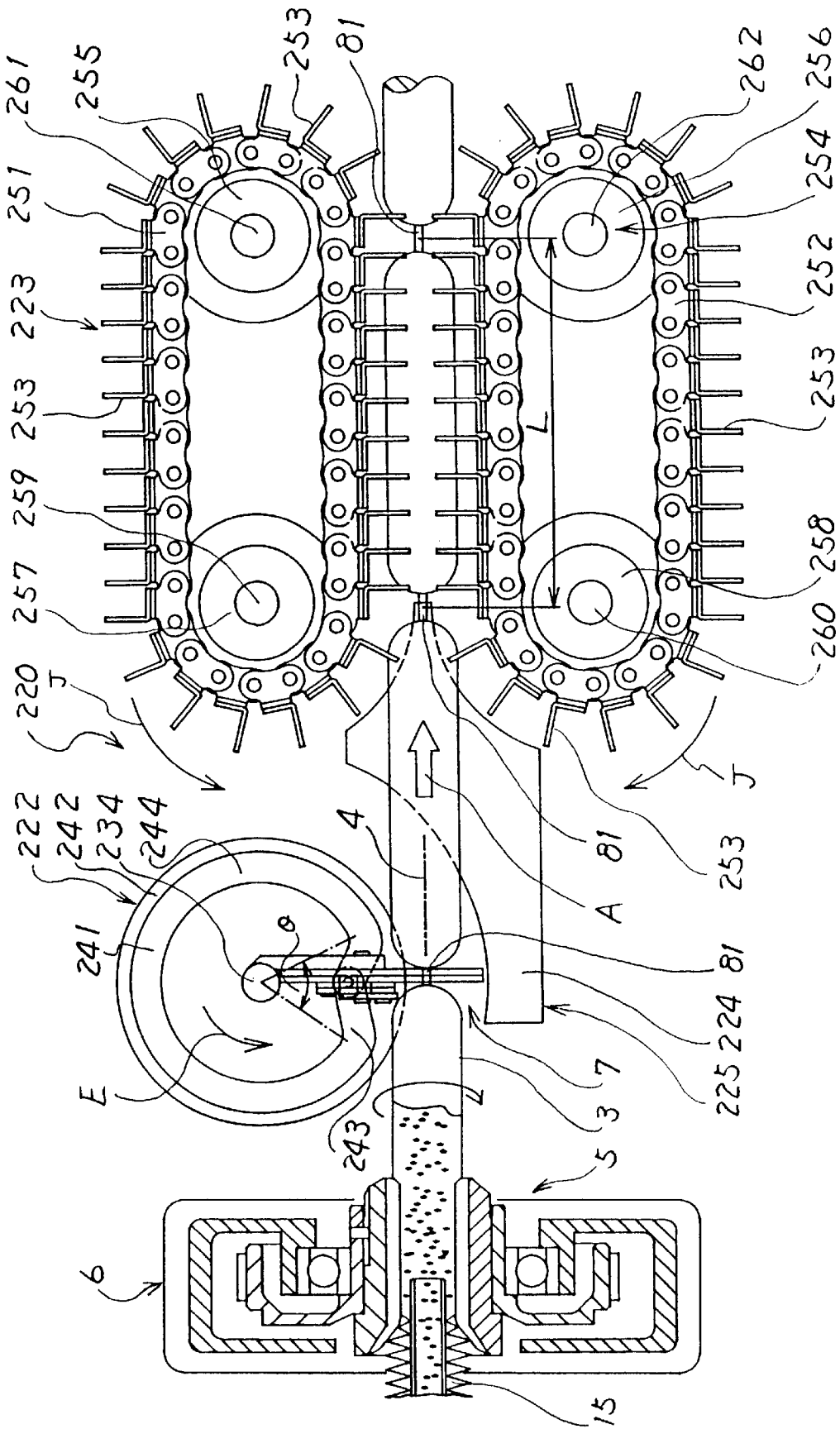
FIG. 12 is a plan view illustrating a further preferred embodiment of the present invention.
Figure 13:
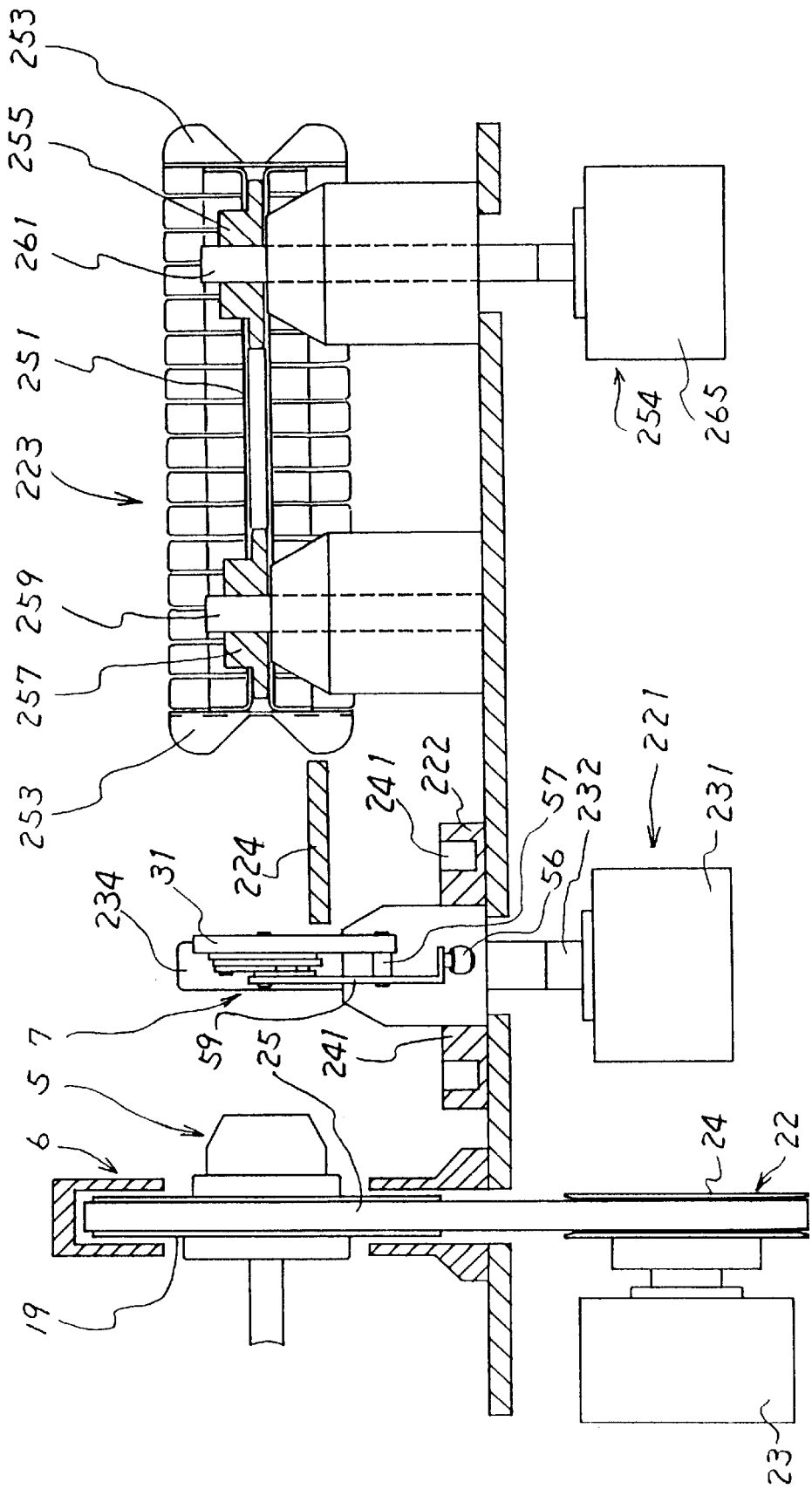
FIG. 13 is a front view illustrating the embodiment shown in FIG. 12.
Figure 14:
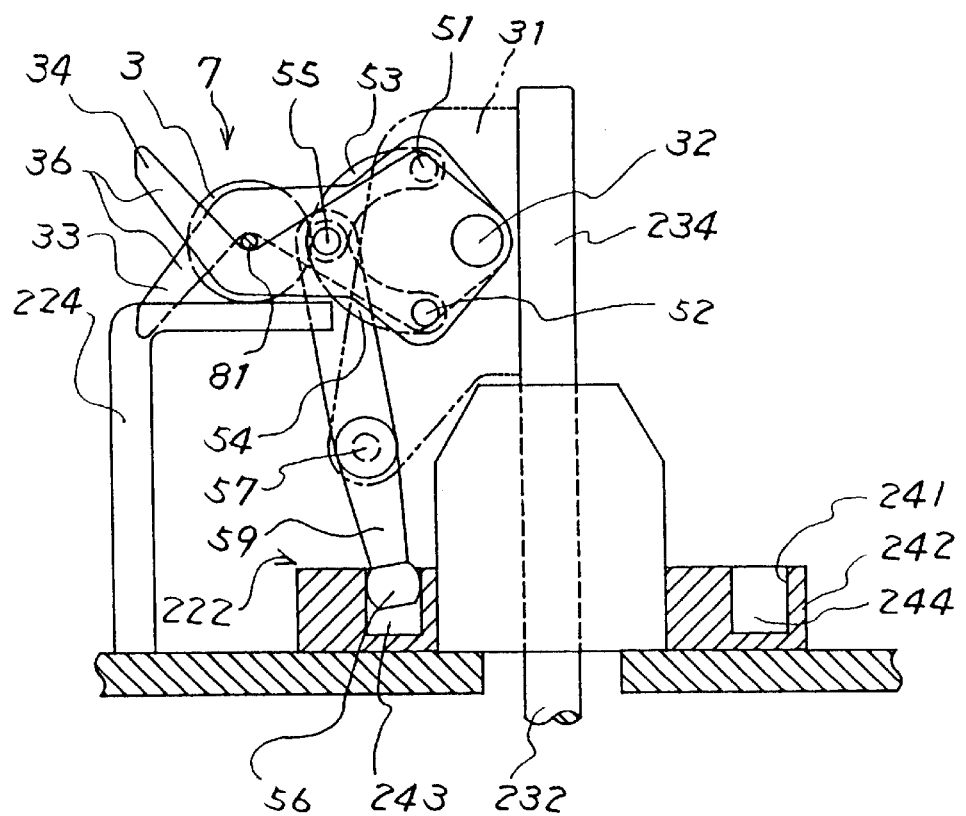
FIG. 14 is a diagram illustrating the operation of the embodiment shown in FIG. 12.
Figure 14:
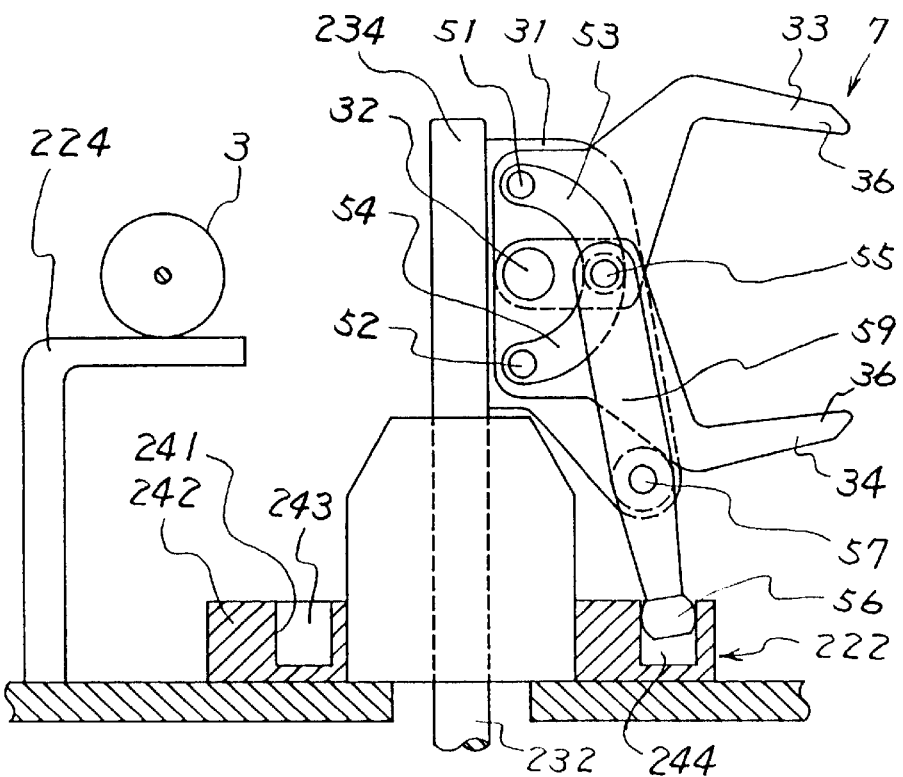
Figure 15:
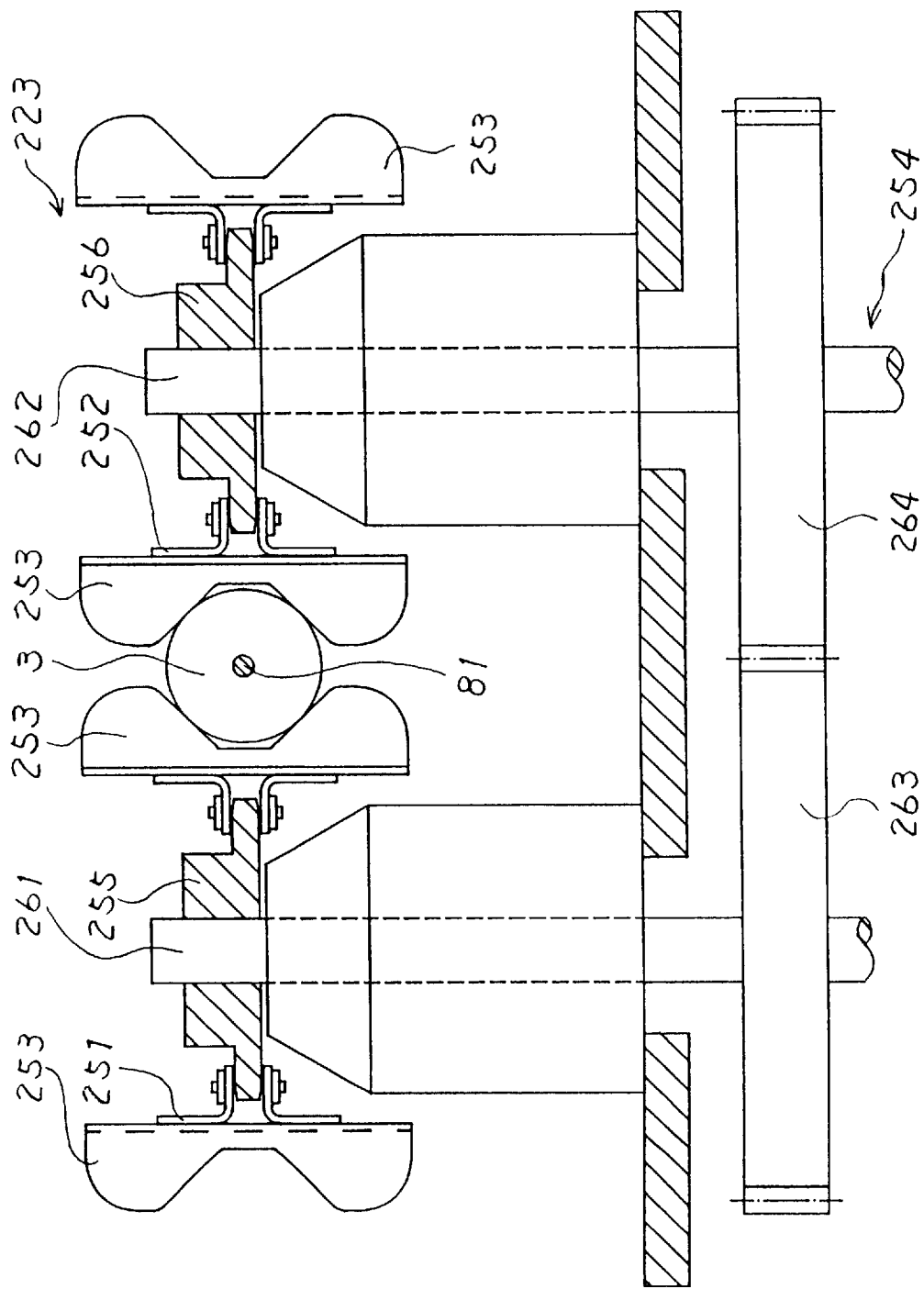
FIG. 15 is a diagram illustrating a conveying device of the embodiment shown in FIG. 12.

Further, although in the above example the electric motor 71 is operated under control by the controller on the basis of a detection signal from the detector 75 to rotate the rotating member 61 when the predetermined nipping means 7 is fully closed, an arrangement may be alternatively provided as shown in FIGS. 10 and 11. That is, a designating means 201 may be provided for designating the nipping means 7 for constricting the stuffed casing 3 at a predetermined interval, and the nipping portions 36 of the nipping means 7 designated by the designating means 201 may be fully closed to allow the nipping means 7 to effect the constricting operation with respect to the stuffed casing 3.

In the example shown in FIGS. 10 and 11, each nipping means 7 is provided with a lever 203 which has a roller 202 attached to one end thereof and is, together with the arm member 59, attached to the upright portion 58 of the bracket 31 by means of the shaft 57 in such a manner as to be rotatable between a first position and a second position. Each arm member 59 serving as a movable member is integrally provided with, instead of the roller 56, an engaging portion 204 which, when the lever 203 is rotated to the first position, prevents further rotation of the lever 203 and engages the lever 203. The designating means 201 is provided with a lever rotating means 205 which designates the nipping means 7 for effecting a constricting operation by counting the number of the nipping means 7 through the detection of the passage of the nipping means 7 and by rotating the lever 203 to the first position upon arrival of the nipping means 7 for effecting the constricting operation. The lever rotating means 205 is provided with an air cylinder 206, a push rod 207 which is extended and retracted by the air cylinder 206, a detector 75 for detecting the passage of the nipping means 7, and a controlling means (not shown) which counts the number of the nipping means 7 on the basis of a detection signal from the detector 75 and actuates the air cylinder 206 on the basis of the result of the count upon arrival of the nipping means 7 for effecting the constricting operation. Upon arrival of the predetermined nipping means 7, the designating means 201 actuates the air cylinder 206 to project the push rod 207, whereby the lever 203 is rotated about the shaft 57 in the H direction and is rotated to the first position.

In the example shown in FIGS. 10 and 11, the means 9 for causing a constricting operation to be effected is provided with a fixed cam member 211 which engages with the lever 203 (the left-hand lever 203 in FIG. 11) which has been rotated to the first position. The cam member 211 has at its lower surface a cam portion which includes a leading cam surface and a main cam surface 213 for coming into contact with and engagement with the roller 202 of the lever 203. In the movement of the designated nipping means 7 in the B direction, the means 9 for causing a constricting operation to be effected causes the roller 202 of the lever 203 rotated to the first position to be brought into contact and engagement with the leading cam surface and the main cam surface 213 of the cam member 211 to further rotate the lever 203, whereby the arm member 59 engaging with the lever 203 at the engaging portion 204 is rotated about the shaft 57, thereby fully closing the nipping portions 36 of the nipping means 7 designated by the designating means 201.

The maintaining means 10 shown in FIGS. 10 and 11 is provided with a cam member 212 which continues from the cam member 211 and is disposed along the linear moving path of the nipping means 7. The cam member 212 has at its lower surface a cam portion constituted by a cam surface which comes into contact and engagement with the roller 202 of the lever 203. In the movement of the designated nipping means 7 in the B direction, the roller 202 of the lever 203 is brought into contact with and engagement with the cam surface, thereby maintaining the fully closed state, set by the means 9 for causing a constricting operation to be effected, of the nipping portions 36 of the nipping means 7 designated by the designating means 201. In addition, in the same way as described above, the means 11 for causing a holding operation to be effected, which is shown in FIGS. 10 and 11, is provided with the column, the bracket 93 attached to the column by means of an adjust screw, and the elongated cam member 94 attached to the bracket and extending along the linear moving path of the nipping means 7, such that the nipping means 7 other than the nipping means 7 designated by the designating means 201 is semi-closed so as to cause the nipping means 7 other than the designated nipping means 7 to effect a holding operation with respect to the stuffed casing 3.

In FIGS. 10 and 11, the fully opening means 12 is constituted by the cam member 111 in the same way as described above. In this example, the lower end of the arm member 59 of each nipping means 7 having the lever 203 which has been rotated to the second position is brought into contact with and engagement with the cam surface 113 of the cam member 111, thereby rotating the arm member 59 of each nipping means 7 to set the nipping portions 36 in the fully open state. Incidentally, although not shown in FIGS. 10 and 11, a guide member for rotating the lever 203 about the shaft 57 and returning it to the second position (the rotated position of the right-hand lever 203 in FIG. 11) is provided in this example. In addition, in this embodiment, the means 9 for causing a constricting operation to be effected may be constituted by, instead of the cam member 211, the rotating member 61 serving as the movable member capable of engaging the lever 203 rotated to the first position as well as the continuously rotating means 62 or the intermittently rotating means 121.

Further, an apparatus 220 for manufacturing sausages may be formed as shown in FIGS. 12 to 15. In FIGS. 12 to 15, the apparatus 220 for manufacturing sausages in this example is comprised of the following: the above-described rotating means 5; a single nipping means 7; a circulatingly moving means 221 for continuously moving the nipping means 7 in a circulating manner at a moving speed which is at a predetermined ratio with respect to the moving speed of the stuffed casing 3 in the A direction; a means 222 for causing the circulatingly moving nipping means 7 to effect a constricting operation with respect to the stuffed casing 3 by fully closing the nipping means 7; a conveying device 223 for conveying the stuffed casing 3 in the A direction while holding the stuffed casing 3 by nipping it from both sides; and a suspension preventing means 225 constituted by a support plate 224 for preventing the suspension of the stuffed casing 3 by supporting from below the stuffed casing 3 which is being transferred from the rotating means 5 to the conveying device 223.

The circulatingly moving means 221 is provided with an electric motor 231 and a rotating shaft 234 connected to an output rotating shaft 232 of the electric motor 231. In this example, the single nipping means 7 is attached to the rotating shaft 234 by means of the bracket 31. Each time the stuffed casing 3 is moved by the link length L, the electric motor 231 rotates the rotating shaft 234 in the E direction and rotates the nipping means 7 similarly in the E direction, so as to obtain a desired link length L. If it is assumed that the moving speed (conveying speed) of the stuffed casing 3 in the A direction does not change, in a case where sausages of a shorter link length L are to be obtained, the circulatingly moving means 221 in this example continuously rotates the rotating shaft 234 at a higher speed; meanwhile, in a case where sausages of a longer link L are to be obtained, the circulatingly moving means 221 continuously rotates the rotating shaft 234 at a lower speed, i.e., continuously rotates the nipping means 7 in a circulating manner.

In the continuous circulating movement of the nipping means 7 by the circulatingly moving means 221, the speed of the electric motor 231 may be controlled such that the rotating speed of the nipping means 7 becomes identical to the moving speed of the stuffed casing 3 in the range of the rotational angle θ in which the nipping means 7 is closed and comes into contact with the stuffed casing 3 to constrict the stuffed casing 3, so that slippage does not occur between the nipping means 7 and the stuffed casing 3. Further, the speed of the electric motor 231 may be controlled as follows: That is, the rotation of the nipping means 7 in the E direction is temporarily stopped at a predetermined position without continuously rotating the nipping means 7 in the E direction until the portion of the stuffed casing 3 to be constricted arrives. Upon arrival of the portion to be constricted the nipping means 7 is rotated again in the E direction at such a speed that slippage does not occur with the stuffed casing 3 in the range of the rotational angle θ, and the nipping means 7 is continued to be rotated up to the predetermined position at the same speed also outside the range of the rotational angle θ. In other words, the nipping means 7 is intermittently moved in a circulating manner. To obtain sausages of a shorter link length L, a plurality of nipping means 7 may be provided, as required, at predetermined intervals, and the above-described intermittent movement may be effected.

The electric motor 231 may be controlled such that, instead of adjusting the rotating speed of the nipping means 7 in the range of the rotational angle θ to the moving speed of the stuffed casing 3, the nipping means 7 is continuously rotated at a constant speed or intermittently rotated at a constant speed to allow the nipping means 7 to constrict the stuffed casing 3. The slippage occurring between the nipping means 7 and the stuffed casing 3 can be minimized by reducing the range of the rotational angle θ.

To obtain sausages of a shorter link length L or reduce the difference in speed between nipping means 7 and the stuffed casing 3, a plurality of nipping means 7 may be disposed on the rotating shaft 234 at predetermined intervals.

The means 222 for causing a constricting operation to be effected is provided with a cam 242 on which a cam groove 241 is formed. The roller 56 of the arm member 59 of the nipping means 7 is disposed in the cam groove 241. In the range of the rotational angle θ, the cam groove 241 has a portion 243 which is gradually displaced toward the inner side so as to rotate the arm member 59 in such a manner as to fully close the nipping portions 36 of the nipping means 7 as well as a portion 243 which is displaced toward the outer side so as to rotate the arm member 59 in such a manner as to fully open the fully closed nipping portions 36. Further, outside the range of the rotational angle θ, the cam groove 241 has a portion 244 which extends in an annular shape concentrically with the rotating shaft 234. Thus the cam groove 241 is formed endlessly.

As the roller 56 of the arm member 59 engages the portion 243 in the rotation of the nipping means 7 in the E direction, the means 222 for causing a constricting operation to be effected rotates the arm member 59 about the shaft 57. Consequently, as shown in the part (a) of FIG. 14, the nipping portions 36 of the nipping means 7 are fully closed, and the stuffed casing 3 is nipped and constricted by the nipping members 33 and 34. Thus, the twisted portion 81 is produced in the stuffed casing 3 by means of the constriction of the stuffed casing 3 and the rotation of the stuffed casing 3 about its longitudinal axis 4 on the upstream side of the constricting position. During the engagement with the portion 243, the means 222 for causing a constricting operation to be effected rotates the arm member 59 about the axis 57 in the opposite direction to the above-described direction, with the result that the nipping portions 36 of the nipping means 7 are fully opened, as shown in the part (b) of FIG. 14, thereby causing the nipping means 7 to cancel the nipping of the stuffed casing 3.

The apparatus for manufacturing sausages may be formed by replacing the means 222 for causing a constricting operation to be effected by the already described means 9 for causing a constricting operation to be effected. The electric motor 71 controlled such that the arm member 59 is rotated by the cam surface 141 (see FIG. 6) of the rotating member 61 so that the nipping portions 36 are started to be fully closed when the nipping means 7 has arrived at a desired position. The position of the nipping means 7 can be specified by providing the disk 74 on the rotating shaft 234 and by detecting the amount of movement of the disk 74 by means of the detector 75. The timing at which the nipping of the stuffed casing 3 by the nipping means 7 is started and the nipping time can be set as desired by changing the timing and speed of rotation of the rotating member 61 with respect to the nipping means 7.

The conveying device 223 is provided with a pair of endless chains 251 and 252 juxtaposed in a horizontal direction; a multiplicity of lugs 253 attached to the respective endless chains 251 and 252 at equal intervals; and a traveling means 254 for traveling the endless chains 251 and 252 in mutually opposite directions. The traveling means 254 is provided with drive-side sprocket wheels 255 and 256 and driven-side sprocket wheels 257 and 258 between which the endless chains 251 and 252 are respectively trained; support shafts 259 and 260 for rotatably supporting the sprocket wheels 257 and 258, respectively; rotating shafts 261 and 262 to which the sprocket wheels 255 and 256 are respectively secured; gears 263 and 264 which mesh with each other and are respectively attached to the rotating shafts 261 and 262; and an electric motor 265 having an output rotating shaft connected to the rotating shaft 261. By means of the mutually meshing gears 263 and 264, the sprocket wheels 255 and 256 are rotated in mutually opposite directions in synchronism with each other.

As the electric motor 265 is operated, the conveying device 223 rotates the sprocket wheels 255 and 256 in mutually opposite directions by means of the rotating shafts 261 and 262, thereby causing the endless chains 251 and 252 to travel similarly in mutually opposite directions J. Consequently, the stuffed casing 3 in the linked form divided by the twisted portions 81 is nipped by the multiplicity of lugs 253 attached to the endless chains 251 and 252, respectively, at equal intervals, and is conveyed in the A direction. The speed at which the stuffed casing 3 is conveyed by the conveying device 223 is determined according to the amount of meat supplied into the casing 15.

In this apparatus 220 for manufacturing sausages as well, since the nipping means 7 is moved in a circulating manner at a moving speed which is at a predetermined ratio with respect to the moving speed of the stuffed casing 3 in the A direction, sausages having a desired link length L can be easily manufactured by simply changing the predetermined ratio, i.e., without the replacement of component parts such as endless chains. In addition, it is possible to reliably and accurately produce twists in the stuffed casing 3 by constriction.

Figure 16:
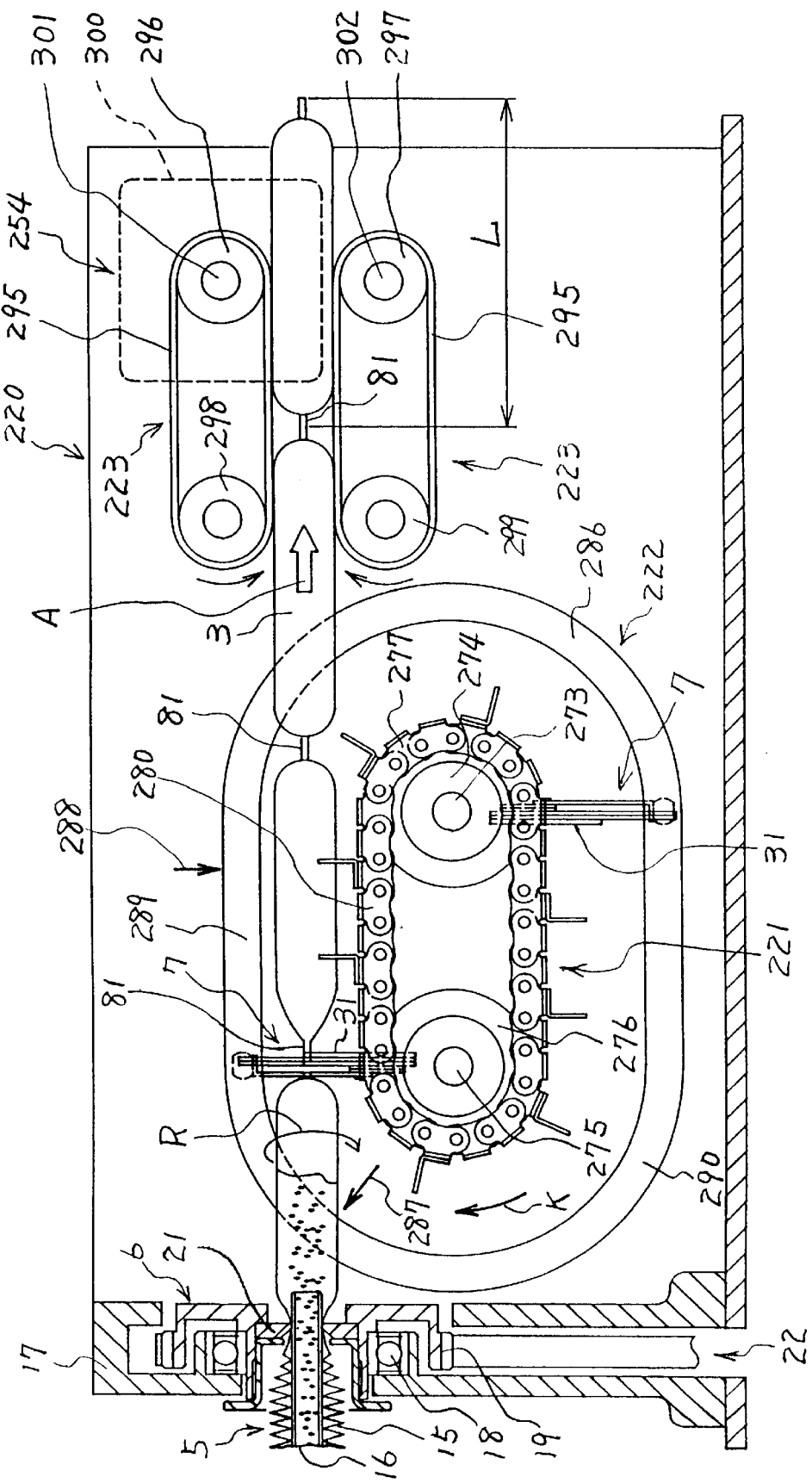
FIG. 16 is a plan view illustrating a further preferred embodiment of the present invention.
Figure 17:
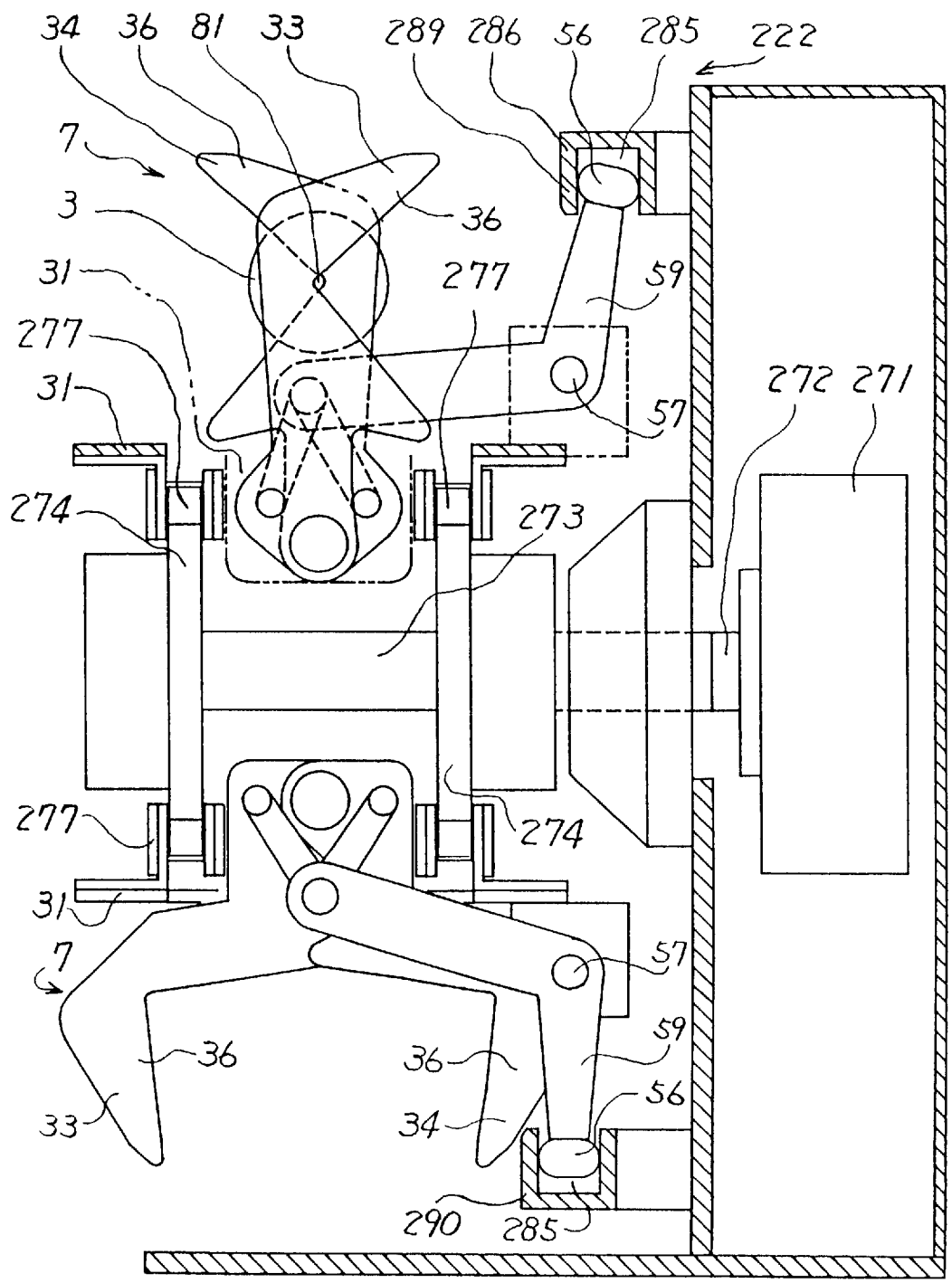
FIG. 17 is a side view illustrating the embodiment shown in FIG. 16.

In the apparatus 220 for manufacturing sausages, the circulatingly moving means 221, the means 222 for causing a constricting operation to be effected, and the conveying device 223 may be constructed as shown in FIGS. 16 and 17. The circulatingly moving means 221 of this example shown in FIGS. 16 and 17 is arranged to linearly move the nipping means 7 in an area for effecting the constricting operation with respect to the stuffed casing 3, and is provided with an electric motor 271, a pair of drive-side sprocket wheels 274 attached to a rotating shaft 273 connected to an output rotating shaft 272 of the electric motor 271, a pair of driven-side sprocket wheels 276 attached to a rotating shaft 275, and a par of endless chains 277 trained between the sprocket wheels 274 and 276. A plurality of, in this example two, nipping means 7 are attached to the endless chains 277, respectively, at equal intervals by means of the brackets 31. As the electric motor 271 is operated to rotate the sprocket wheels 274, and the rotation of the sprocket wheels 274 causes the endless chains 277 to travel in the K direction, thereby moving the respective nipping means 7 in the K direction. The endless chains 277 are arranged to travel in a linear moving area 280. Hence, the circulatingly moving means 221 linearly moves the nipping means 7 in the area where the constricting operation with respect to the stuffed casing 3 is effected by the nipping means 7, such that the nipping means 7 is moved in parallel with the movement of the stuffed casing 3 and together with the stuffed casing 3.

The means 222 for causing a constricting operation to be effected, which is shown in FIGS. 16 and 17, is provided with a substantially elliptical annular cam 286 having an endless cam groove 285 which is laterally open. The roller 56 of the arm member 59 of each nipping means 7 is disposed in the endless cam groove 285. The substantially elliptical annular cam 286 has a portion 289 disposed at a low level from a position 289 to a position 288 so as to fully close the nipping portions 36 of the nipping means 7, as well as a portion 290 disposed at a high level by inclining gradually from the portion 289 so as to fully open the nipping portions 36 of the nipping means 7. As the roller 56 of the arm member 59 engages the portion 289 in the circulating movement of the nipping means 7 in the K direction, this means 222 for causing a constricting operation to be effected rotates the arm member 59 about the shaft 57. Consequently, as shown on the upper side in FIG. 17, the nipping portions 36 of the nipping means 7 are fully closed, and the stuffed casing 3 is nipped and constricted by the nipping members 33 and 34. Thus, the twisted portion 81 is produced in the stuffed casing 3 by means of the constriction of the stuffed casing 3 and the rotation of the stuffed casing 3 about its longitudinal axis 4 on the upstream side of the constricting position. After the engagement with the portion 289, as the roller 56 of the arm member 59 is subsequently engaged with the portion 290, the means 222 for causing a constricting operation to be effected rotates the arm member 59 about the axis 57 in the opposite direction to the above-described direction, with the result that the nipping portions 36 of the nipping means 7 are fully opened, as shown in the lower side of FIG. 14, thereby causing the nipping means 7 to cancel the nipping of the stuffed casing 3.

In the example shown in FIGS. 16 and 17 as well, the apparatus for manufacturing sausages may be formed by replacing the means 222 for causing a constricting operation to be effected by the already described means 9 for causing a constricting operation to be effected. The electric motor 71 controlled such that the arm member 59 is rotated by the cam surface 141 (see FIG. 6) of the rotating member 61 so that the nipping portions 36 are started to be fully closed when the nipping means 7 has arrived at a desired position. The position of the nipping means 7 can be specified by providing the disk 74 on the rotating shaft 273 and by detecting the amount of movement of the disk 74 by means of the detector 75. The timing at which the nipping of the stuffed casing 3 by the nipping means 7 is started and the nipping time can be set as desired by changing the timing and speed of rotation of the rotating member 61 with respect to the nipping means 7.

The conveying device 223 shown in FIG. 16 uses, instead of the aforementioned endless chains 251 and 252, a pair of endless belts 295 juxtaposed in a vertical direction. The traveling means 254 of the conveying device 223 is provided with drive-side and driven-side pulleys 296, 297, and 298, 299 between which the endless belts 295 are trained, and a rotatively driving device 300 constituted by an electric motor for rotating the drive-side pulleys 296 and 297 in synchronism with each other in mutually opposite directions. By the operation of the rotatively driving device 300, the pulleys 296 and 297 are rotated in mutually opposite directions by means of rotating shafts 301 and 302 and the like to cause the pair of endless belts 295 similarly in the opposite directions. Consequently, the stuffed casing 3 in the link form with the link length L and divided by the twisted portions 81 is nipped by the endless belts 295, and is conveyed in the A direction.

With the apparatus 220 for manufacturing sausages shown in FIGS. 16 and 17, it is possible to produce an effect similar to the above-described effect.

With the apparatus 220 for manufacturing sausages shown in FIGS. 16 and 17, the braking ring 21 is disposed in such a manner as to come into contact with the unstuffed casing 15 fitted over the stuffing nozzle 16, and is rotated by the braking-ring rotating device 22 in a manner similar to that of the stuffing nozzle 16 which is rotated. Accordingly, with the apparatus 20 of this example, the means 5 for rotating the stuffed casing 3 is constituted by the stuffing nozzle 16 and the braking ring 21 which are rotated. The braking ring 21 can be rotated by the rotating stuffing nozzle 16 instead of rotating the braking ring 21 by means of the braking-ring rotating device 22. In this case, the means 5 for rotating the stuffing nozzle 3 can be constituted only by the stuffing nozzle 16 and a rotating means (not shown) for rotating the stuffing nozzle 16.

We claim:

1. An apparatus for manufacturing linked food products having a desired link length, comprising:

rotating means for rotating a continuous stuffed casing, which has been stuffed with a raw food product material, about a longitudinal axis thereof;

a plurality of nipping means arranged at predetermined intervals for nipping the stuffed casing issuing from said rotating means;

moving means for moving said nipping means thereby moving the stuffed casing; and means for selectively causing a predetermined one of said plurality of nipping means to effect a constricting operation with respect to the stuff casing at an area through which said plurality of nipping means pass in turn, said constricting operation being accomplished by fully closing said predetermined one of nipping means in response to movement of said nipping means by said moving means.

2. An apparatus for manufacturing linked food products having a desired link length according to claim 1, wherein said means for causing a constricted operation to be effected includes a rotating member for causing said predetermined nipping means to effect a constricting operation with respect to the stuffed casing in response to rotation of said rotating member, and continuously rotating means for continuously rotating said rotating member in response to movement of said nipping means.

3. An apparatus for manufacturing linked food products having a desired link length according to claim 1, wherein said means for causing a constricted operation to be effected includes a rotating member for causing said predetermined nipping means to effect a constricting operation with respect to the stuffed casing in response to rotation of said rotating member, and intermittently rotating means for intermittently rotating said rotating member in response to movement of said nipping means.

4. An apparatus for manufacturing linked food products having a desired link length according to claim 1, wherein said means for causing a constricted operation to be effected includes a reciprocating member for causing said predetermined nipping means to effect a constricting operation with respect to the stuffed casing in response to reciprocation of said reciprocating member, and reciprocating means for reciprocating said reciprocating member in response to movement of said nipping means.

5. An apparatus for manufacturing linked food products having a desired link length according to claim 1 wherein said means for causing a constricting operation to be effected includes a cam.

6. An apparatus for manufacturing linked food products having a desired link length according to claim 5, further comprising:

means for causing said nipping means other than said predetermined one of said nipping means to effect a holding operation with respect to the stuffed casing by semi-closing said nipping means other than said predetermined one of said nipping means.

7. An apparatus for manufacturing linked food products having a desired link length according to claim 1, further comprising:

means for causing said nipping means other than said predetermined one of said nipping means to effect a holding operation with respect to the stuffed casing by semi-closing said nipping means other than said predetermined one of said nipping means.

8. An apparatus for manufacturing linked food products having a desired link length according to claim 1, further comprising:

maintaining means for maintaining a fully closed state of said predetermined nipping means during the constricting operation.

9. An apparatus for manufacturing linked food products having a desired link length according to claim 1, wherein said means for causing a constricting operation to be effected includes a fully-closing-operation start position of said predetermined nipping means and a fully-closing-operation completion position thereof and means for changing said positions.

10. An apparatus for manufacturing linked food products having a desired link length, comprising:

rotating means for rotating a continuous stuffed casing, which has been stuffed with a raw food product material, about a longitudinal axis thereof;

a plurality of nipping means arranged at predetermined intervals for nipping the stuffed casing issuing from said rotating means;

moving means for moving said nipping means thereby moving the stuffed casing;

designating means for selectively designating at a predetermined interval certain of said nipping means of said plurality thereof to effect a constricting operation with respect to the stuffed casing at an area through which said plurality of nipping means pass in turn; and means for causing said selectively designated certain nipping means to effect a constricting operation with respect to the stuffed casing at said area by fully closing said certain selectively designated nipping means.

11. An apparatus for manufacturing linked food products having a desired link length according to claim 10, wherein each of said nipping means is provided with a lever rotatable between a first position and a second position, and said designating means being provided with a lever rotating means for designating said certain nipping means which is to effect a constricting operation, by rotating said lever to a first position.

12. An apparatus for manufacturing linked food products having a desired link length according to claim 11, wherein each of said nipping means is provided with a movable member engageable with said lever when said lever has been rotated to the first position.

13. An apparatus for manufacturing linked food products having a desired link length, according to claim 10, further comprising:

means for causing said nipping means other than said certain nipping means designated by said designating means to effect a holding operation with respect to the stuffed casing by semi-closing said nipping means other than said certain designated nipping means.

14. An apparatus for manufacturing linked food products having a desired link length according to claim 10, further comprising:

maintaining means for maintaining said certain nipping means fully closed during the constricting operation.

15. An apparatus for manufacturing linked food products having a desired link length according to claim 10, wherein said means for causing the constricting operation to be effected includes a changeable fully-closing operation start position of said nipping means and fully-closing-operation completion thereof.

16. An apparatus for manufacturing linked food products having a desired link length, comprising:

moving means for moving a continuous stuffed casing, in which a raw food product material is stuffed, along a longitudinal axis thereof;

rotating means for rotating the stuffed casing, which moves along said longitudinal axis and relatively to said rotating means, about said longitudinal axis;

nipping means for nipping the stuffed casing issuing from said rotating means;

circulatingly moving means for circulatingly moving said nipping means at a moving speed with a predetermined ratio with respect to a moving speed of the stuffed casing and at selected different moving speeds; and means for causing said nipping means which is circulatingly moved to effect a constricting operation with respect to the stuffed casing by fully closing said nipping means.

17. An apparatus for manufacturing linked food products having a desired link length according to claim 16, wherein said means for causing a constricting operation to be effected includes a cam for fully closing said nipping means.

18. An apparatus for manufacturing linked food products having a desired link length according to claim 16, wherein said circulatingly moving means is arranged to continuously move said nipping means in a circular path.

19. An apparatus for manufacturing linked food products having a desired link length according to claim 18, wherein said moving means for moving the continuous stuffed casing nips both sides of the stuffed casing and holds the stuffed casing, said nipping means being provided with a pair of nipping portions having a rotational center laterally of said longitudinal axis.

20. An apparatus for manufacturing linked food products having a desired link length according to claim 19, wherein said circulatingly moving means is arranged to linearly move said nipping means in an area where the constricting operation with respect to the stuffed casing is terminated.

21. An apparatus for manufacturing linked food products having a desired link length according to claim 16, wherein said circulatingly moving means is arranged to intermittently move said nipping means in a circular path.

22. An apparatus for manufacturing linked food products having a desired link length according to claim 16, wherein said circulatingly moving means is arranged to linearly move said nipping means in an area where the constricting operation with respect to the stuffed casing is terminated.

23. An apparatus for manufacturing linked food products having a desired link length according to claim 16, wherein said means for causing a constricting operation to be effected includes a changeable fully-closing-operation start position of said nipping means and a fully-closing-operation completion position thereof.

24. An apparatus for manufacturing linked food products having a desired link length, comprising:

rotating means for rotating a continuous stuffed casing, which has been stuffed with a raw food product material, about a longitudinal axis thereof;

a plurality of nipping means arranged at predetermined intervals for nipping the stuffed casing from said rotating means;

moving means for moving said nipping means thereby moving the stuffed casing; and means for causing a predetermined one of said nipping means to effect a constricting operation with respect to the stuffed casing by fully closing said predetermined nipping means in association with the movement of said nipping means by said moving means;

said means for causing a constricted operation to be effected includes a rotating member for causing said predetermined nipping means to effect a constricting operation with respect to the stuffed casing by rotating said member, and means for intermittently rotating said rotating member in association with the movement of said nipping means.

25. An apparatus for manufacturing linked food products having a desired link length according to claim 24, wherein said means for causing a constricting operation to be effected is provided with a cam.

26. An apparatus for manufacturing linked food products having a desired link length, comprising:

rotating means for rotating a continuous stuffed casing, which has been stuffed with a raw food product material, about a longitudinal axis thereof;

a plurality of nipping means arranged at predetermined intervals for nipping the stuffed casing from said rotating means;

moving means for moving said nipping means thereby moving the stuffed casing; and means for causing a predetermined one of said nipping means to effect a constricting operation with respect to the stuffed casing by fully closing said predetermined nipping means in association with the movement of said nipping means by said moving means, said means for causing a constricted operation to be effected includes a reciprocating member for causing said predetermined nipping means to effect a constricting operation with respect to the stuffed casing by a reciprocating motion, and reciprocating means for reciprocating said reciprocating member in association with the movement of said nipping means.

27. An apparatus for manufacturing linked food products having a desired link length, comprising:

rotating means for rotating a continuous stuffed casing, which has been stuffed with a raw food product material, about a longitudinal axis thereof;

a plurality of nipping means arranged at predetermined intervals for nipping the stuffed casing from said rotating means;

moving means for moving said nipping means thereby moving the stuffed casing;

designating means for designating at a predetermined interval one of said nipping means to effect a constricting operation with respect to the stuffed casing;

means for causing said one nipping means designated by said designating means to effect a constricting operation with respect to the stuffed casing by fully closing said designated nipping means; and means for causing said nipping means other than said one nipping means designated by said designating means to effect a holding operation with respect to the stuffed casing by semi-closing said nipping means other than said designated one nipping means.

28. An apparatus for manufacturing linked food products having a desired link length, comprising:

rotating means for rotating a continuous stuffed casing, which has been stuffed with a raw food product material, about a longitudinal axis thereof;

nipping means for nipping the stuffed casing from said rotating means;

circulatingly moving means for circulatingly moving said nipping means at a moving speed which is at a predetermined ratio with respect to a moving speed of the stuffed casing; and means for causing said nipping means which is circulatingly moved to effect a constricting operation with respect to the stuffed casing by fully closing said nipping means;

said circulatingly moving means being arranged to intermittently move said nipping means in a circulating manner.

* * * * *

UNITED STATES PATENT AND TRADEMARK OFFICE
CERTIFICATE OF CORRECTION

PATENT NO.   : 5,830,051
DATED        : November 3, 1998
INVENTOR(S)  : Minoru Kasai; Minoru Nakamura

It is certified that error appears in the above-identified patent and that said letters patent is hereby corrected as shown below:

Title page, item [54] and col. 1, line 1,
Title of invention, change "MANFACTURING" to --MANUFACTURING--
Item [75] Change co-inventor's first name to --Minoru--
Claim 1, line 17, "in response to" should read --in association with--
Claim 2, line 8, "in response to" should read --in association with--
Claim 3, line 8, "in response to" should read --in association with--
Claim 4, line 8, "in response to" should read --in association with--
Claim 24, line 7, insert --issuing-- after "casing"
Claim 26, line 7, insert --issuing-- after "casing"
Claim 27, line 7, insert --issuing-- after "casing--

Signed and Sealed this

Sixth Day of April, 1999

*Attest:*

Q. TODD DICKINSON

*Attesting Officer*   *Acting Commissioner of Patents and Trademarks*